(12) United States Patent  
Kim et al.

(10) Patent No.: US 8,984,242 B2
(45) Date of Patent: Mar. 17, 2015

(54) COMPUTING SYSTEM AND HIBERNATION METHOD THEREOF

(75) Inventors: Kyu-Dong Kim, Yongin-si (KR); Dogeun Kim, Seoul (KR); Sungchul Kim, Hwaseong-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 574 days.

(21) Appl. No.: 13/290,307

(22) Filed: Nov. 7, 2011

(65) Prior Publication Data

US 2012/0117344 A1    May 10, 2012

(30) Foreign Application Priority Data

Nov. 8, 2010   (KR) .................. 10-2010-0110516

(51) Int. Cl.
*G06F 12/16*   (2006.01)
*G06F 1/32*    (2006.01)
*G06F 9/44*    (2006.01)

(52) U.S. Cl.
CPC ............ *G06F 1/3275* (2013.01); *G06F 9/4418* (2013.01); *Y02B 60/1225* (2013.01)
USPC .......................... 711/162; 711/202; 714/6.23

(58) Field of Classification Search
CPC ....................... G06F 11/1456; G06F 11/2082
USPC .................... 711/162, 202; 714/6.23
See application file for complete search history.

(56) References Cited

U.S. PATENT DOCUMENTS

| 7,634,592 B2 | 12/2009 | Kadatch et al. |
| 2003/0191916 A1* | 10/2003 | McBrearty et al. ........... 711/162 |
| 2008/0082752 A1* | 4/2008 | Chary et al. .................. 711/118 |

FOREIGN PATENT DOCUMENTS

| JP | 2000-020157 | 1/2000 |
| KR | 10-2004-0090418 | 10/2004 |
| KR | 10-2008-0071627 | 8/2008 |

* cited by examiner

*Primary Examiner* — Jae Yu
(74) *Attorney, Agent, or Firm* — Ellsworth IP Group PLLC

(57) ABSTRACT

A hibernation method of a computing system that includes generating backup data and write addresses according to at least a portion of data utilized by the computing system at a hibernation request, generating conversion addresses corresponding to a first non-volatile memory when the write addresses correspond to a second non-volatile memory, and storing the backup data in the first non-volatile memory according to either the write addresses or the conversion addresses.

15 Claims, 22 Drawing Sheets

COMPUTING SYSTEM AND HIBERNATION METHOD THEREOF

CROSS-REFERENCE TO RELATED APPLICATIONS

This application claims priority under 35 U.S.C §119(a) from Korean Patent Application No. 10-2010-0110516 filed Nov. 8, 2010 in the Korean Intellectual Property Office, the disclosure of which is incorporated by reference herein in its entirety.

BACKGROUND OF THE INVENTION

1. Field of the Invention

Exemplary embodiments relate to an operating method of a computing system, and more particularly, relate to a hibernation method.

2. Description of the Related Art

A semiconductor memory device may be a memory device which is formed using semiconductor materials such as silicon (Si), germanium (Ge), gallium arsenide (GaAs), indium phospide (InP), and the like. The semiconductor memory device may be either a volatile memory device or a non-volatile memory device.

A volatile memory device is a memory device which loses data stored therein at power-off. The volatile memory device includes SRAM (Synchronous Random Access Memory), DRAM (Dynamic Random Access Memory), SDRAM (Synchronous Dynamic Random Access Memory), and the like. A non-volatile memory device is a memory device which retains data stored therein even at power-off. The non-volatile memory device includes read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. Flash memory is mainly divided into a NOR type and a NAND type.

If a selected memory cell is previously programmed with data, a reset operation may be required to be performed on the selected memory cell before data is programmed in the selected memory cell. That is, an erase operation is required to be performed on the selected memory cell. On the other hand, although data is previously written on selected region of hard disk drive (HDD), where the HDD is an over-writable storage device, the HDD supports writing of data in the selected region without erasing.

SUMMARY OF THE INVENTION

Exemplary embodiments of the present general inventive concept can provide a hibernation method of a computing system which includes generating backup data and write addresses according to at least a portion of data utilized by the computing system at a hibernation request, generating conversion addresses corresponding to a first non-volatile memory when the write addresses correspond to a second non-volatile memory, and storing the backup data in the first non-volatile memory according to at least one of the write addresses and the conversion addresses.

Additional features and utilities of the present general inventive concept will be set forth in part in the description which follows and, in part, will be obvious from the description, or may be learned by practice of the general inventive concept.

Exemplary embodiments of the present general inventive concept can also provide a computing system which includes a first and second non-volatile memories, and a storage management unit receiving backup data and write addresses generated according to data being executed at a hibernation and generating conversion addresses corresponding to the first non-volatile memory when the write addresses correspond to the second non-volatile memory, where the backup data is stored in at least one of the first non-volatile memory according to either one of the write addresses and the conversion addresses.

Exemplary embodiments of the present general inventive concept may also provide a hibernation method of a computing system which comprises determining whether a hibernation request is generated, when the hibernation is requested, generating backup data according to data to be retained by the computing system, determining whether the data to be retained by the computing system is related with a non-overwriting storage device of the computing system, when the data to be retained by the computing system is related with the non-overwriting storage device of the computing system, generating conversion addresses for the backup data, and storing the backup data in an overwriting storage device of the computing system according to the conversion addresses.

Exemplary embodiments of the present general inventive concept may also provide a method of operating a recovery mode in a computing system, the method including receiving a recovery request, loading a mapping table by reading data of a predetermined storage region, where the mapping table includes conversion addresses corresponding to a first non-volatile memory and write addresses corresponding to a second non-volatile memory, and reading back-up data from the first non-volatile memory according to the retrieved conversion addresses.

Exemplary embodiments of the present general inventive concept may also provide a hibernation method of a computing system, the method including receiving a hibernation request, generating back-up data and write addresses according to the hibernation request, generating temporary data of at least one application program of the computing system, and temporary addresses of at least one non-volatile memory where the generated temporary data is to be stored, storing the generated back-up data, write addresses, temporary data, and temporary addresses into a cache memory, and distinguishing the back-up data and the temporary data using the sequentiality of the write addresses.

The hibernation method may also include transferring the generated temporary data according to the generated temporary address, when the write addresses correspond with an address area of a first non-volatile memory, generating conversion addresses corresponding to a second non-volatile memory, and transferring the back-up data to the second non-volatile memory, and when the write addresses do not correspond with the address area of the first non-volatile memory, transferring the back-up data to the second non-volatile memory.

Exemplary embodiments of the present general inventive concept may also provide a hibernation method of a computing system, the method including determining when a hibernation request has been generated, generating back-up data and write addresses, generating temporary data and temporary addresses, when the generated write addresses and the temporary addresses correspond to an address area of a first non-volatile memory, generating conversion addresses and temporary conversion addresses, and transferring and storing the back-up data and the temporary data to a second non-volatile memory, and when the generated write addresses and the temporary addresses do not correspond to the address area of the first non-volatile memory, transferring and storing the back-up data and the temporary data to the second non-volatile memory.

The hibernation method may include where the conversion addresses are generated when the write addresses correspond to the first non-volatile memory, and wherein the temporary conversion addresses are generated when the write addresses correspond to the first non-volatile memory.

The hibernation method may include where the back-up data and the temporary data are transferred and stored to the second non-volatile memory according to the generated conversion addresses and the temporary conversion addresses.

The hibernation method may include where the back-up data and the temporary data are transferred and stored to the second non-volatile memory according to the generated write addresses and the temporary addresses.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
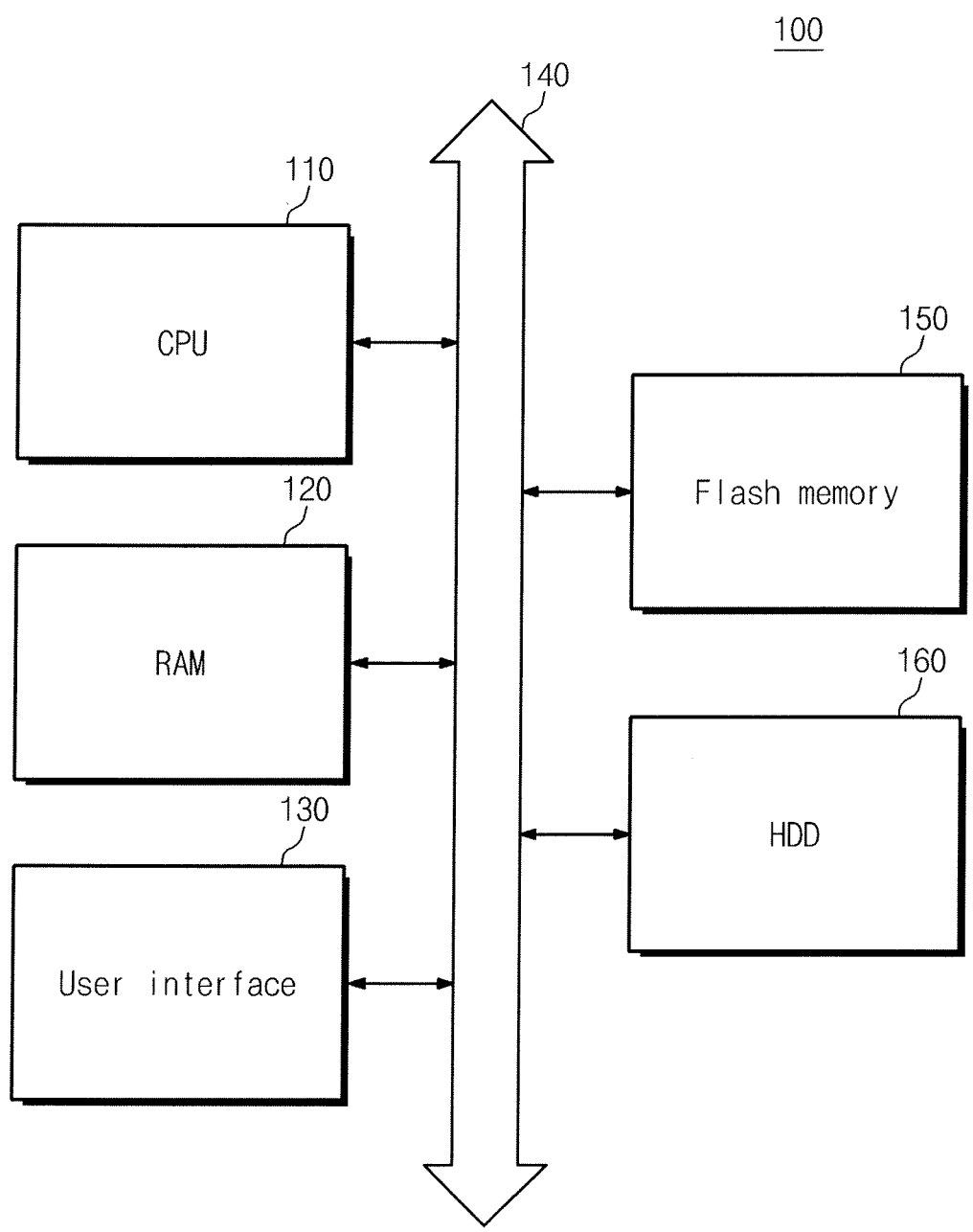
FIG. 1 is a block diagram illustrating a computing system including a flash memory and a hard disk drive according to exemplary embodiments of the present general inventive concept.

The inventive concept is described more fully hereinafter with reference to the accompanying drawings, in which embodiments of the inventive concept are illustrated. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating a computing system including a flash memory and a hard disk drive according to exemplary embodiments of the present general inventive concept. Referring to FIG. 1, a computing system 100 can include CPU 110, RAM 120, a user interface 130, a system bus 140, a flash memory 150 that is a non-overwriting storage device, and a hard disk drive (HDD) 160 that is an overwriting storage device.

The CPU 110 can control the operation of the computing system 100. The CPU 100 may be a central processing unit, a programmable logic device, a field programmable gate array, an integrated circuit, and/or any suitable processor to carry out the exemplary embodiments of the present general inventive concept disclosed herein. The CPU 110 can be communicatively connected with the RAM 120, the user interface 130, the flash memory 150, and the HDD 160 via the system bus 140. The RAM 120 may be any suitable random access memory to store data to carry out the exemplary embodiments of the present general inventive concept. The HDD 160 may be a hard disk drive or a solid state drive. The CPU 110 can load data stored in the RAM 120 and can calculate at least one available address to store the loaded data. The CPU 110 can store data produced according to the calculation result in at least one of the RAM 120, the flash memory 150, or the HDD 160.

The system bus 140 can electrically and/or communicatively connect the flash memory 150 and the HDD with the CPU 110, the RAM 120, and the user interface 130. For example, when addresses corresponding to the HDD 160 are transferred from the CPU 110 via the system bus 140, the system bus 140 can form a channel through which data is transferred between the CPU 110 and the HDD 160.

Data provided via the user interface 130 and/or processed by the CPU 110 can be stored in at least one of the flash memory 150 and the HDD 160. Data stored in at least one of the flash memory 150 and the HDD 160 can be retained even at power-off. Data stored in the RAM 120 may not retained at power-off.

The flash memory 150 may include a plurality of memory cells (not illustrated). The flash memory 150 can receive data to be stored, as well as addresses (e.g., values for available addresses), from the system bus 140. The flash memory 150 can program and/or write the received data in memory cells corresponding to the received address. That is, the received data may be stored in the flash memory 150 at the received addresses. In exemplary embodiments of the present general inventive concept, data may be programmed and/or stored in memory cells as a voltage is applied to the memory cells and threshold voltages thereof are shifted. A data program speed of the flash memory 150 may be faster than that of the HDD 160. That is, the rate (i.e., speed) at which data can be programmed and/or stored in the flash memory 150 may be greater than the rate at which data can be programmed and/or stored on the HDD 160.

The HDD 160 may include a platter (not illustrated) to record data, a spindle motor (not illustrated) to rotate the platter, and a head (not illustrated) to read and write data. When data is stored in the HDD 160, the spindle motor can rotate the platter, and the head can record data in the rotating platter.

Where data is programmed and/or stored in a predetermined storage region of the flash memory 150, a reset operation may again program data in the predetermined storage region. That is, an operation of erasing data programmed in the predetermined storage region may be performed. Where program and erase operations are executed over a program-erase cycle by the flash memory 150, the reliability of data stored in the flash memory 150 may be lowered and/or reduced.

The HDD 160 can provide an overwrite function. A reset operation may not be activated when a data rewrite operation is requested with respect to a predetermined storage region of the HDD 160 in which data was previously stored. That is, the HDD 160 can perform a rewrite operation on a predetermined storage region of the HDD 160 in which data was previously stored, without an erase operation. In exemplary embodiments of the present general inventive concept, the HDD 160 can be changed, substituted, and/or replaced with other overwritable storage devices.

A hibernation request can be issued during an operation of the computing system 100. For example, an operating system (e.g., unified operating system 220 illustrated in FIG. 2 and described below) being driven by the computing system 100 can issue the hibernation request when a user does not use the computing system 100 during a given time. Alternatively, the hibernation request may be issued according to a signal received via the user interface 130. That is, the user may make a selection via the user interface 130 so as to issue the hibernation request. The flash memory 150 and/or the HDD 160 may recognize the hibernation request. For example, the CPU 110 may generate a control signal (not illustrated) in response to the hibernation request. The flash memory 150 and the HDD 160 may generate a ready signal (not illustrated) in response to the control signal of the CPU 110 to wait to receive data.

Upon receiving the hibernation request, data that is utilized and/or driven by the computing system 100 may be converted into backup data. The converted backup data can be stored in the HDD 160. That is, a status of the computing system 100 before the hibernation can be stored by storing the backup data in the HDD 160. When the hibernation is released, the computing system 100 may be recovered into a status before the hibernation according to the backup data. The hibernation may be released, for example, upon receipt of a command from a user via the user interface 130 and/or according to a control signal issued by the operating system (e.g., unified operating system 220 illustrated in FIG. 2 and described below). In exemplary embodiments of the present general inventive concept, upon receipt of the recovery request, backup data stored in the HDD 160 can be loaded on the RAM 120 such that a recovery operation is executed.

Backup data may be stored in the flash memory 150 when hibernation is requested. If data is previously stored in memory cells in which backup data is to be stored, memory cells in which backup data is to be stored may be erased by an erase operation. A program-erase cycle the flash memory 150 may be limited. That is, the number of programming operations and erase operations available for the flash memory 150 may be limited over the serviceable lifetime of the flash memory 150. If backup data is stored in the flash memory 150 whenever a hibernation function is executed, a program-erase number of the flash memory 150 increases. Accordingly, in the computing system 100 in which backup data is stored in the flash memory 150, the reliability of data stored in the flash memory 150 may be lowered and/or reduced due to the frequent hibernation. That is, the reliability of the data stored in the flash memory 150 may be reduced when the number of program-erase cycles executed by the flash memory 150 increases.

With exemplary embodiments of the present general inventive concept, the reliability of data stored in the flash memory 150 may be improved and/or increased by storing backup data generated at a hibernation request in the HDD 160.

In exemplary embodiments of the present general inventive concept, the flash memory 150 may be a solid state drive (SSD), which can include a storage device configured to store data in one or more semiconductor memories.

In exemplary embodiments of the present general inventive concept, the flash memory 150 may be a memory card such as PC card (Personal Computer Memory Card International Association (PCMCIA) card), CF (Compact Flash), SM (SmartMedia), SMC (Smart Media Card), memory stick, MMC (MultiMediaCard), RS-MMC (Reduced-Size MultiMediaCard), MMC-micro (MultiMediaCard-micro), SD (Secure Digital) card (e.g., SD, miniSD, microSD, SDHC (Secure Digital High Capacity), UFS (Unix File System), and the like.

In exemplary embodiments of the present general inventive concept, the computing system 100 may be a computer, portable computer, Ultra Mobile PC (UMPC), workstation, netbook, PDA (Personal Digital Assistant), web tablet, wireless phone, mobile phone, smart phone, e-book, PMP (portable multimedia player), digital camera, digital audio recorder/player, digital picture/video recorder/player, set-top box, home media server, e-book, portable game machine, navigation system, black box, digital multimedia broadcasting (DMB) player, 3-dimensional television, a device to transmit and receive information wirelessly, one of more electronic devices included in a home network and/or local area network, one or more electronic devices included in a computer network, one or more electronic devices included in a telematics network, RFID (Radio Frequency Identification), or one or more (SSD or memory card) electronic devices included in a computing system.

Figure 2:
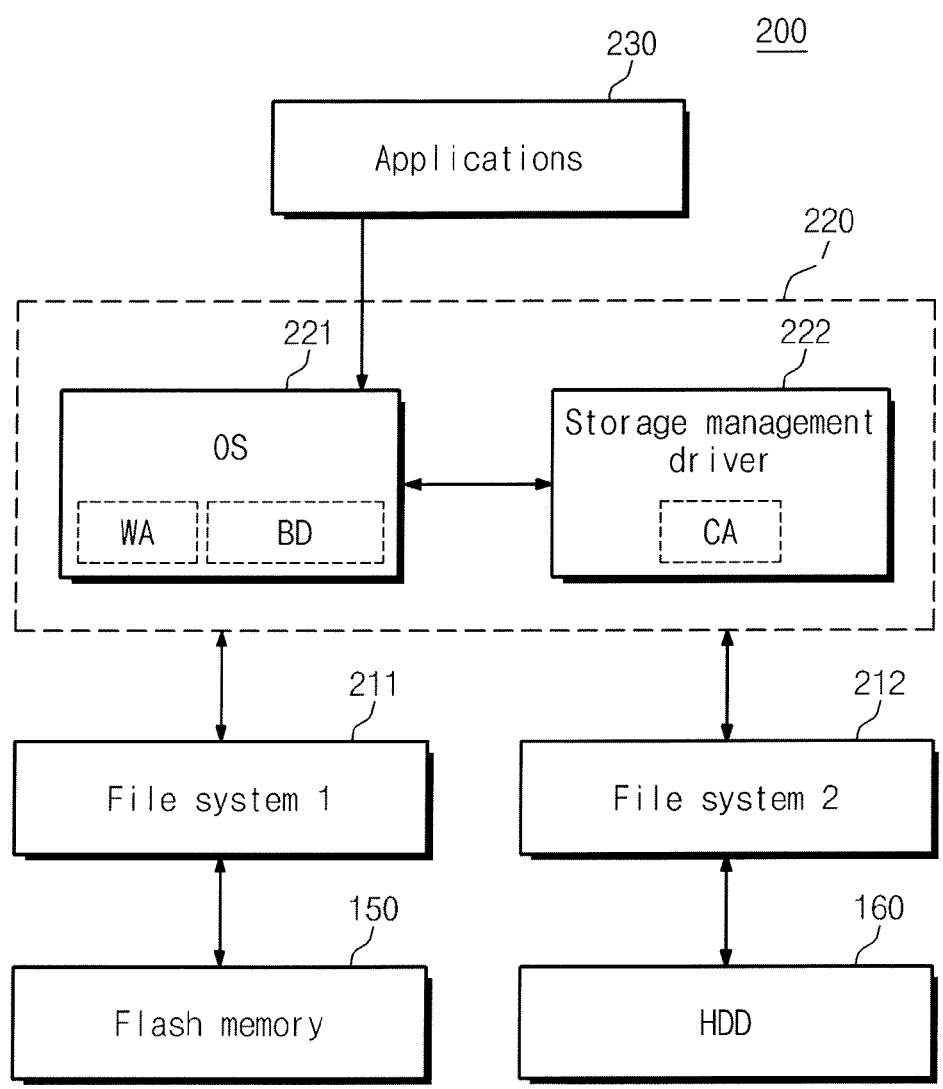
FIG. 2 illustrates a software layer architecture according to exemplary embodiments of the present general inventive concept.

FIG. 2 illustrates a software layer architecture according to exemplary embodiments of the present general inventive concept. Referring to FIG. 2, software 200 may be installed on and/or driven by, for example, the computing system 100. The software 200 can include a first file system 211, a second file system 212, a unified operating system 220, and applications 230.

The first file system 211 can include information on a region of a flash memory 150 in which data is stored. The second file system 212 can include information on a region of a HDD 160 in which data is stored. That is, the first and second file systems 211 and 212 can include information to store data in the flash memory 150 and the HDD 160, respectively. The first and second file systems 211 and 212 can include information to search data of the flash memory 150 and the HDD 160, respectively.

In an exemplary embodiments of the present general inventive concept, the first and second file systems 211 and 212 can include a master boot record (MBR) (not illustrated), respectively. When a computing system 100 is powered on, information on locations of the flash memory 150 and the HDD 160 at which data is stored, according to the master boot records, is provided to, for example, the CPU 110 of the computing system 100.

The unified operating system 220 can include an operating system 221 and a storage management driver 222. The operating system 221 can manage and/or control the operation of the computing system 100, and may be provided to execute the applications 230 installed on the operating system 221 and/or the computing system 100.

The operating system 221 can support the applications 230 such that RAM 120, a user interface 130, a flash memory 150, and HDD 160 in FIG. 1 may be used. At a multitasking operation, the operating system 221 can schedule one or more processes of the applications 221 during execution of the applications 230.

The operating system 221 can determine one or more regions of the flash memory 150 and the HDD 160, in which data is not stored, using the first and second file systems 211 and 212. That is, the first file system 211 can provide information on a storage region, in which data is stored, among data storage regions of the flash memory 150. Such a storage region may be a storage region of a flash memory 150. The first file system 211 can provide information on a storage region, in which data is not stored, among data storage regions of the flash memory 150. Such a storage region is referred to as a free storage region of a flash memory 150.

The second file system 212 can provide information on a storage region, in which data is stored, among data storage regions of the HDD 160. Such a storage region is referred to as a storage region of a HDD 160. The second file system 212 can provide information on a storage region, in which data is not stored, among data storage regions of the HDD 160. Such a storage region is referred to as a free storage region of a HDD 160.

When data is stored in the flash memory 150 or the HDD 160, the operating system 221 can generate a logical block address (LBA) on a free storage region of the flash memory 150 or a free storage region of the HDD 160.

The applications 230 may be application software or an application program executed by the operating system 220. For example, the applications 230 include application software used directly by a user, system software such as a compiler not used directly by a user, and the like. In exemplary embodiments of the present general inventive concept, the applications 230 may include applications to manage the user interface 130.

Where a user makes a selection via the user interface 130, and where the interface 130 generates a predetermined signal according to the selection, an application of managing the user interface 130 may issue a hibernation request. Alternatively, where a user does not use the computing system 100 for a predetermined period of time, the operating system 221 may issue a hibernation request.

When the hibernation request is issued, the operating system 221 can generate backup data BD and write addresses WA. For example, the operating system 221 may convert into backup data BD the data that is stored in the RAM 120, program information on the applications 230, information associated with register setting values, BIOS (Basic Input Output System) setup information, and the like. The operating system 221 can refer to first and second file systems 211 and 212 to generate write addresses WA corresponding to a free storage region of the flash memory 150 and/or a free storage region of the HDD 160.

The storage management driver 222 can monitor the hibernation request. When the hibernation request is detected, the storage management driver 222 can refer to write addresses WA generated by the operating system 221 at the hibernation.

The storage management driver 222 can determine whether the write addresses WA correspond to values of addresses the flash memory 150 or the HDD 160. The storage management driver 222 can generate conversion addresses CA corresponding to addresses of the HDD 160 according to the result of the determination. When the write addresses WA correspond to addresses of the flash memory 150, the storage management driver 222 can generate conversion addresses CA. When the write addresses WA correspond to the addresses of the HDD 160, the storage management driver 222 may not generate conversion addresses CA.

Accordingly, when the write addresses WA correspond to the addresses of the flash memory 150, backup data BD can be stored in the HDD 160 according to conversion addresses CA. When the write addresses WA correspond to the addresses of the HDD 160, backup data BD can be stored in the HDD 160 according to write addresses WA. Backup data BD can be stored in the HDD 160 when a hibernation request is detected.

Figure 3:
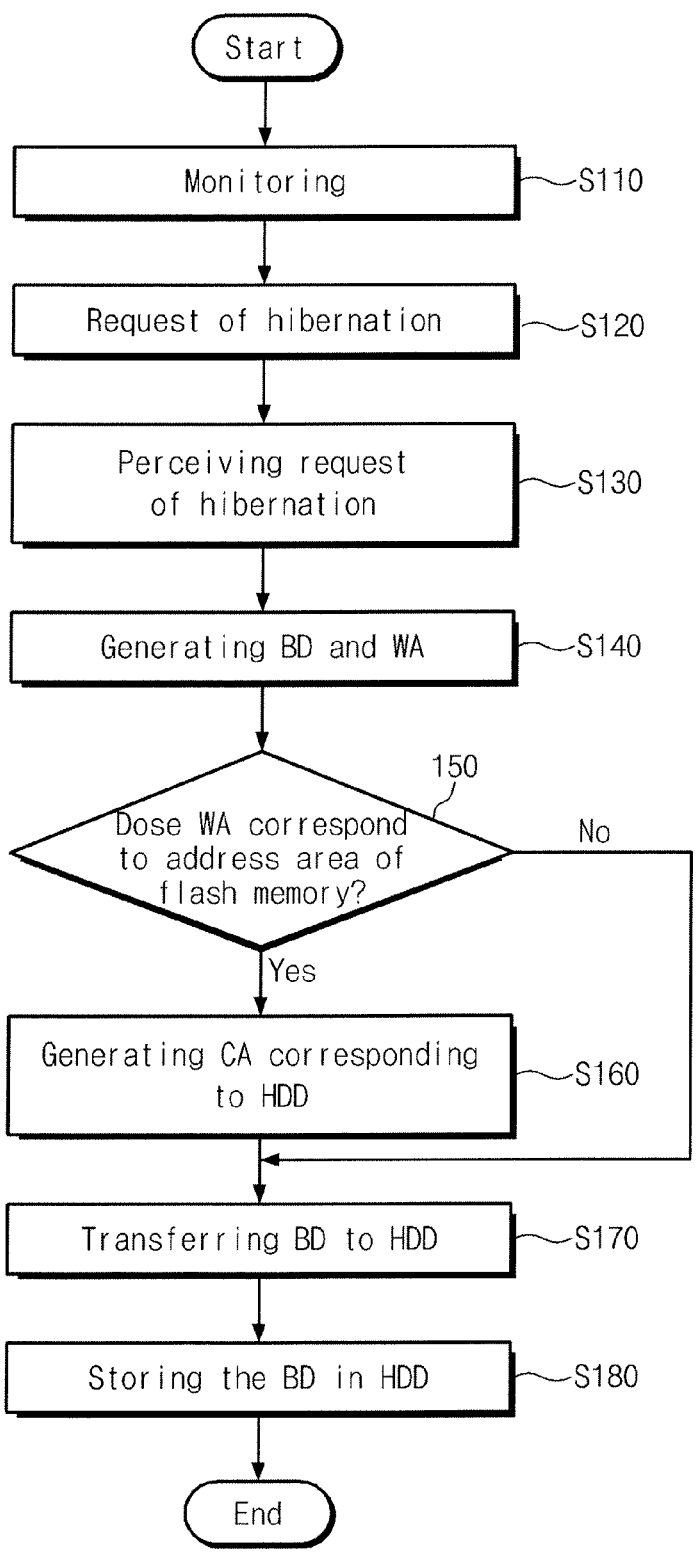
FIG. 3 is a flowchart illustrating a hibernation method according to exemplary embodiments of the inventive concept.

FIG. 3 is a flowchart illustrating a hibernation method according to exemplary embodiments of the present general inventive concept. Referring to FIGS. 1 to 3, in operation S110, a storage management driver 222 can monitor an operating system 221. In operation S120, a hibernation request can be issued by, for example, the unified operating system 220 and/or via the user interface 130 according to a selection by a user. In operation S130, the storage management driver 222 can receive the hibernation request at the operating system 221.

In operation S140, the operating system 221 can generate write addresses WA and backup data BD in response to the hibernation request. The operating system 221 may generate write addresses WA corresponding to any logical block addresses.

In operation S150, the storage management driver 222 can determine whether the write addresses WA correspond to the addresses of the flash memory 150 or the HDD 160. That is, the storage management driver 222 can determine whether the write addresses WA correspond to addresses assigned to the flash memory 150.

When the write addresses WA correspond to addresses assigned to the flash memory 150, the method proceeds to operation S160. When the write addresses WA do not correspond to addresses assigned to the flash memory 150, the method proceeds to operation S170.

In operation S160, the storage management driver 222 can generate conversion addresses CA corresponding to the addresses of the HDD 160. For example, the storage management driver 222 may determine a free storage region of the HDD 160 according to information available via a second file system 212 at the operating system 221. For example, the storage management driver 222 can request information regarding the free storage region of the HDD 160 by making an inquiry and/or request with the second file system 212 to determine a free storage region of the HDD 160.

The storage management driver 222 can generate conversion addresses CA according to the result of the determination of the free storage region of the HDD 160. In exemplary embodiments of the present general inventive concept, the storage management driver 222 may generate logical block addresses corresponding to addresses of the HDD 160.

In exemplary embodiments of the present general inventive concept, the write addresses WA and the conversion addresses CA may be stored in RAM 120 in a mapping table manner. A mapping table may be continually updated until generation of conversion addresses CA is ended (e.g. when a predetermined condition has been reached). A mapping table stored in the RAM 120 may be stored in the flash memory 150 or the HDD 160.

The operating system 221 may generate write addresses WA corresponding to the addresses of the HDD 160. The storage management driver 222 may not generate conversion addresses CA. Backup data DB may be stored in the HDD 160 according to the write addresses WA.

In operation S170, backup data BD can be sent to the HDD 160. In operation S180, the HDD 160 can store the transferred backup data BD. When the write addresses WA correspond to the addresses of the flash memory 150, backup data BD may be stored according to the conversion addresses CA thus generated. When the write addresses WA correspond to the addresses of the HDD 160, backup data BD may be stored according to the write addresses WA.

FIGS. 4 to 7 are block diagrams further illustrating the hibernation method of FIG. 3 according to exemplary embodiments of the present general inventive concept. Below, a hibernation method will be more fully described with reference to FIGS. 4 to 7 under the condition that write addresses WA correspond to a flash memory 150.

Figure 4:
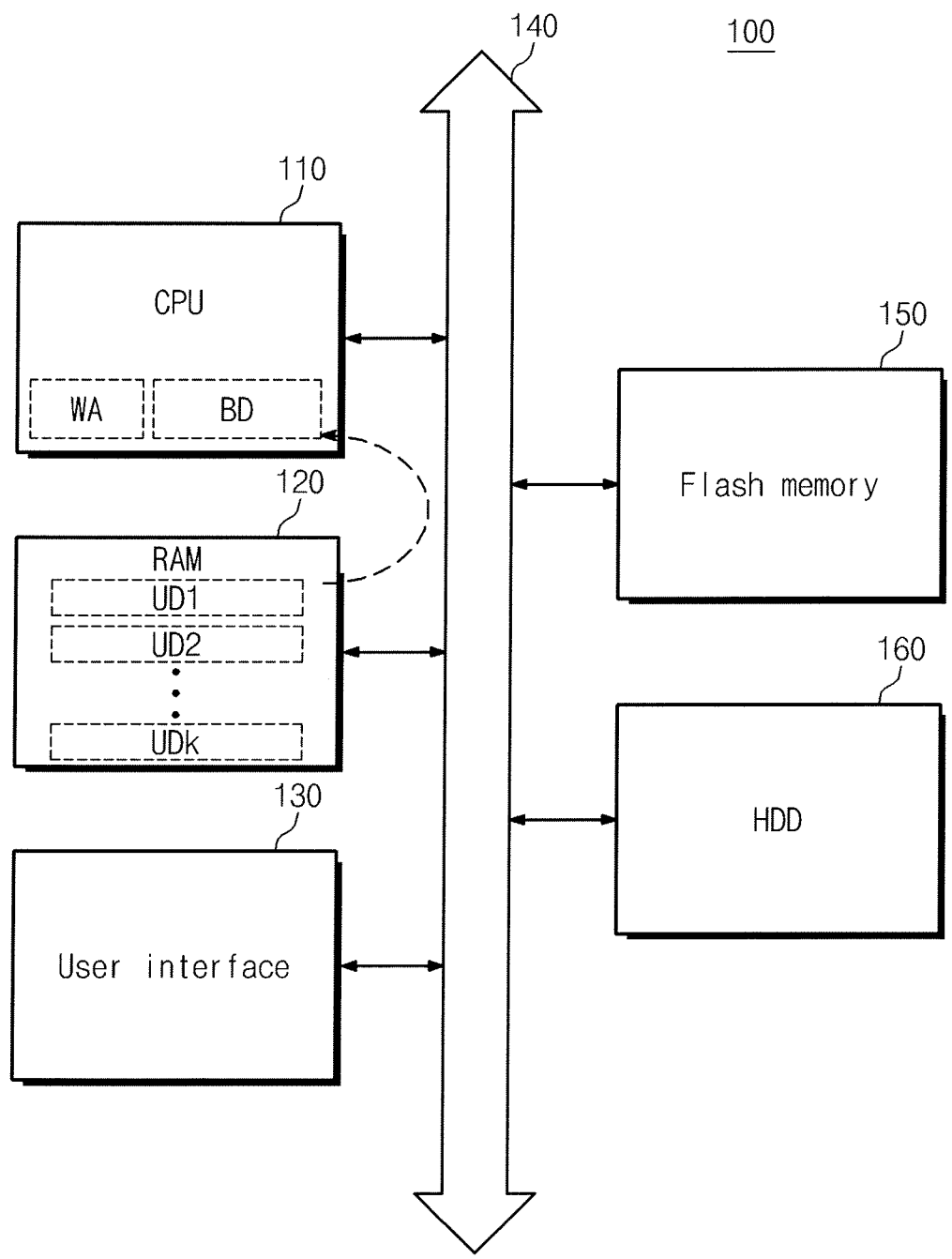
FIGS. 4 to 7 are block diagrams further illustrating the hibernation method of FIG. 3 according to exemplary embodiments of the present general inventive concept.

FIG. 4 illustrates backup data BD and write addresses WA generated by CPU 110 at hibernation. User data UD1 to UDk may be stored in RAM 120 before a hibernation request. When the hibernation request is issued, an operating system 221 may be driven by CPU 110 to generate backup data BD. The user data UD1 to UDk stored in the RAM 120 may be sent to the CPU 110. The operating system 221 may generate backup data BD using the user data UD1 to UDk.

FIG. 4 illustrates an example where backup data BD is generated using the user data UD1 to UDk stored in the RAM 120. Backup data BD may be generated using program information on applications 230, information on register setting values, and BIOS setup information.

Figure 5:
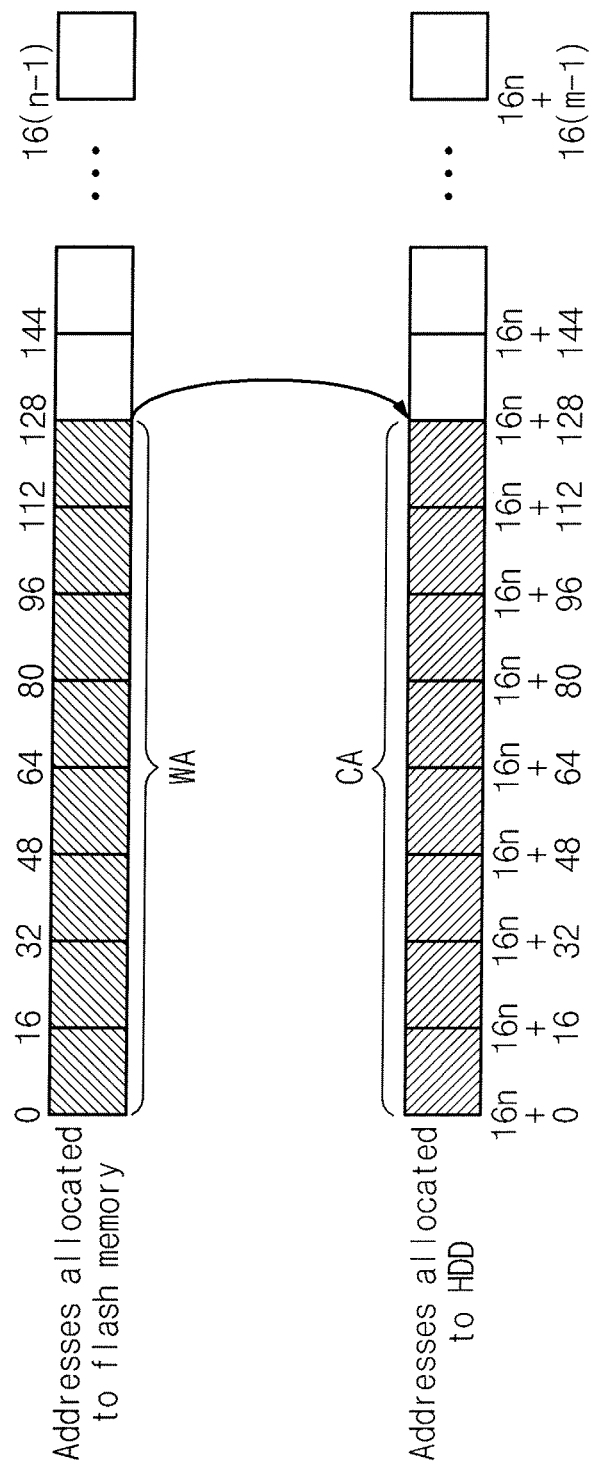

FIG. 5 illustrates write addresses WA generated in FIG. 4 and conversion addresses CA associated with the write addresses WA according to exemplary embodiments of the present general inventive concept. Referring to FIGS. 4 and 5, logical block addresses may be allotted to at least one of the flash memory 150 and the HDD 160. Although logical block addresses may be exemplarily expressed by a multiple of 16 as illustrated in FIG. 5, logical block addresses can be expressed in any suitable multiple (e.g., multiples of 8, 32, 64, 128, etc.).

FIG. 5 illustrates an example where logical block addresses 0 to $16(n-1)$ are allotted to the flash memory 150 and logical block addresses $16n$ to $(16n+16m)$ are allotted to the HDD 160.

Generated write addresses WA may correspond to logical block addresses 0 to 112. The write addresses WA may correspond to the flash memory 150. Accordingly, the storage management driver 222 may generate conversion addresses CA corresponding to the addresses of the HDD 160. FIG. 5 illustrates an example that the generated conversion addresses CA correspond to logical block addresses $16n$ to $(16n+112)$.

Figure 6:
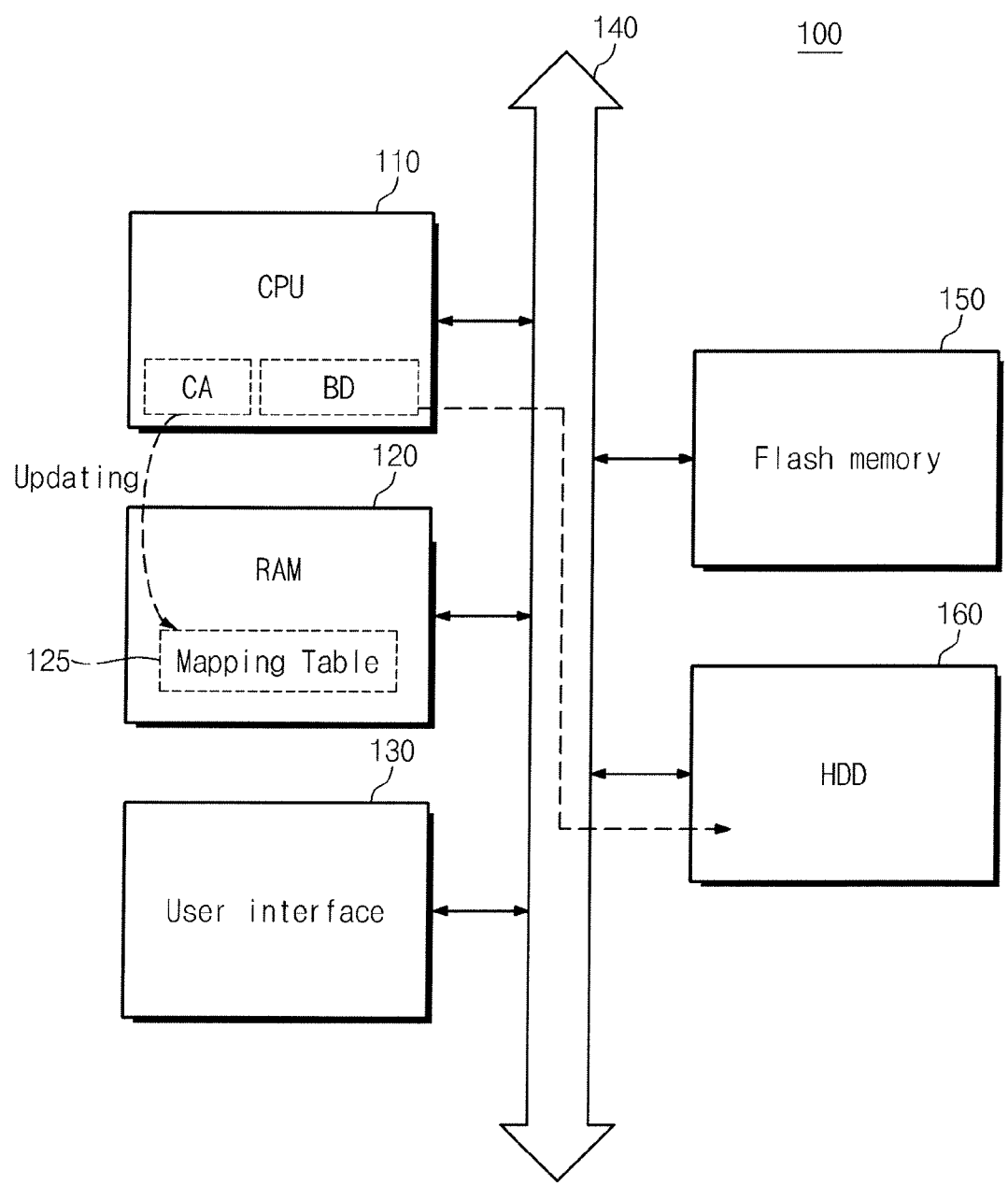

FIG. 6 is a block diagram illustrating the generating of a mapping table 125 and conversion addresses CA according to exemplary embodiments of the present general inventive concept. Referring to FIG. 6, CPU 110 can generate conversion addresses CA. The storage management driver 222 driven by the CPU 110 may generate conversion addresses CA. Backup data BD can be sent to the HDD 160 according to the generated conversion addresses CA. In exemplary embodiments of the present general inventive concept, when conversion addresses CA are transferred to a system bus 140 from the CPU 110, the system bus 140 can provide a channel where data is transferred between the CPU 110 and the HDD 160.

The mapping table 125 may be generated according to generation of conversion addresses CA corresponding to write addresses WA. The storage management driver 222 can store the mapping table including write addresses WA and conversion addresses CA in the RAM 120. The mapping table 125 may include write addresses WA, conversion addresses CA, and mapping information between write addresses WA and conversion addresses CA. The mapping table 125 may be continually updated until generation of conversion addresses CA is ended. In exemplary embodiments of the present general inventive concept, when the mapping table 125 is updated, backup data BD may be sent to the HDD 160 in a real time.

The mapping table 125 may be stored in the flash memory 150 or the HDD 160. A recovery operation may be executed using the stored mapping table 125 after the hibernation is terminated.

FIG. 6 illustrates an example where backup data BD generated by the CPU 110 can be transferred to the HDD 160 via the system bus 140. The backup data BD generated by the CPU 110 may be transferred to the HDD 160 via the RAM 120.

Figure 7:
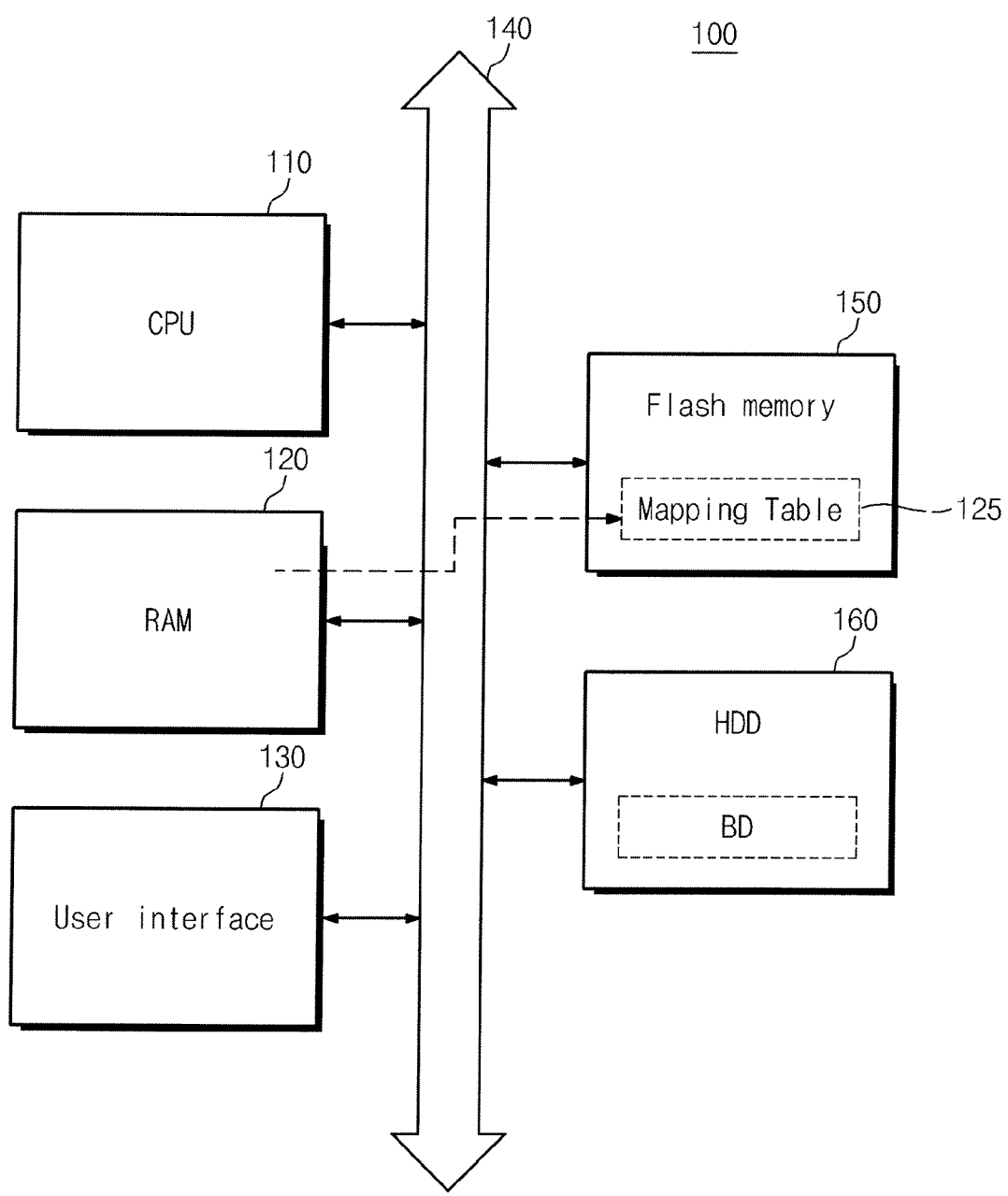

FIG. 7 illustrates transferring the mapping table 125 in FIG. 6 to a flash memory 150. Referring to FIG. 7, the mapping table 125 can be sent to the flash memory 150 from the RAM 120. In exemplary embodiments of the present general inventive concept, the mapping table 125 may be transferred to an appointed storage region of the flash memory 150 in response to the control of the CPU 110.

FIG. 7 illustrates that the mapping table 125 can be stored in the flash memory 150. In exemplary embodiments of the present general inventive concept, the mapping table 125 can be stored in the HDD 160. When the mapping table 125 and backup data BD are stored in the flash memory 150 and the HDD 160, a power to the computing system may be interrupted. That is, as the mapping table 125 and the backup data BD are stored in at least one of the flash memory 150 and the HDD 160, the computing system 100 may experience a power interruption, and the computing system 100 can retrieve the mapping table 125 and the backup data BD from the nonvolatile memory of the flash memory 150 and the HDD 160.

Figure 8:
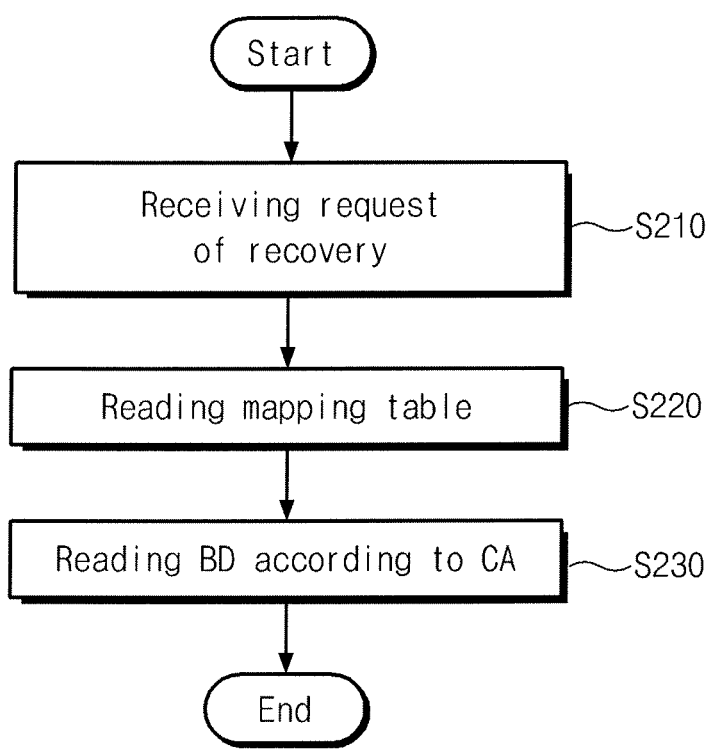
FIG. 8 is a flowchart illustrating a recovery mode executed after backup data is stored according to conversion addresses according to exemplary embodiments of the present general inventive concept.

FIG. 8 is a flowchart illustrating a recovery mode executed after backup data is stored according to conversion addresses. Referring to FIGS. 2 and 8, in operation S210, an operating system 221 can determine whether a recovery request has been made (e.g., the unified operating system 220 can receive and/or process a recovery request). For example, a recovery request can be issued from an application (e.g., an application of applications 230 illustrated in FIG. 2) which controls a user interface 130. Alternatively, the application and/or the unified operating system 220 may receive a recovery request via the user interface 130.

In operation S220, an operating system 221 can read a mapping table 125 in response to the recovery request. For example, the operating system 221 may be set to read data of a predetermined storage region in response to the recovery request. That is, the operating system 221 can be set to read data stored at predetermined addresses of the flash memory 150 and/or the HDD 160. The operating system 221 may load the mapping table 125 by reading data of the predetermined storage region. The operating system 221 may acquire information of write addresses WA and conversion addresses CA according to the mapping table 125.

In operation S230, the operating system 221 can read backup data BD from a HDD 160 according to conversion addresses CA. The operating system 221 may acquire backup data BD and write addresses WA generated at hibernation. The operating system 221 can perform a recovery operation (e.g., perform a recovery operation on the computing system 100 according to at least the backup data BD).

As an example different from that illustrated in FIG. 8, the backup data BD may be stored in the HDD 160 according to write addresses WA. At hibernation, the write addresses WA can be stored in a predetermined storage region (e.g., the write addresses WA can be stored in a predetermined storage region of the flash memory 150 and/or the HDD 160). Upon reception of a recovery request, the operating system 221 may be set to read the predetermined storage region. The operating system 221 can read backup data BD from the HDD 160 according to the write addresses WA. The read backup data BD may be used by the computing system 100 to execute the recovery request.

Figure 9:
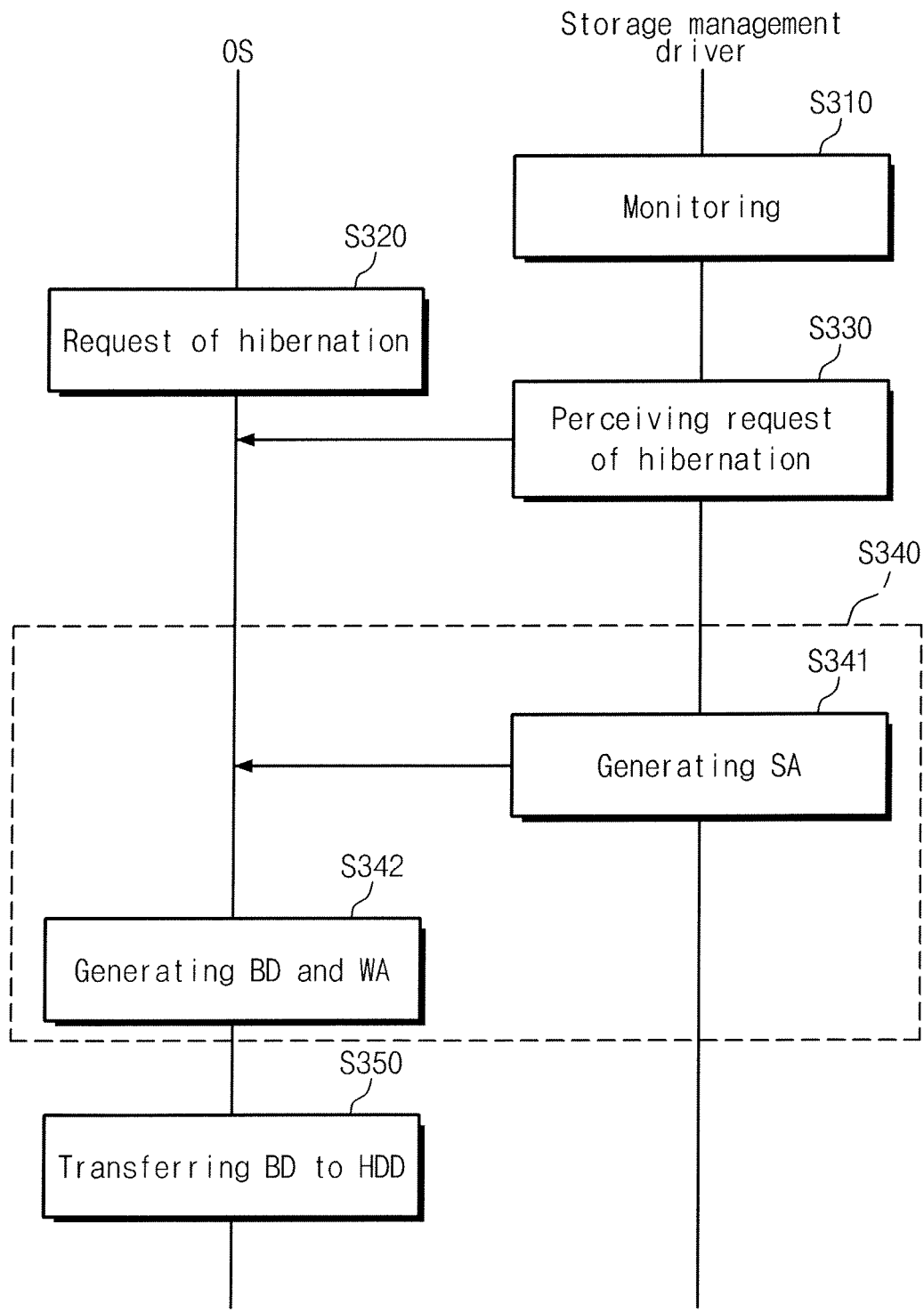
FIG. 9 illustrates a hibernation method according to exemplary embodiments of the present general inventive concept.

FIG. 9 illustrates a hibernation method according to exemplary embodiments of the present general inventive concept. A storage management driver 222 may control an operating system 221 so as to generate write addresses WA corresponding to a HDD 160. Referring to FIGS. 2 and 9, in operation S310, the storage management driver 222 can monitor whether a hibernation request is issued (e.g., by the applications 230 and/or the unified operating system 220 illustrated in FIG. 2, or as received by the user interface 130 illustrated in FIG. 1). In operation S320, a hibernation request can be issued. In operation S330, the storage management driver 222 can determine that the hibernation request has been issued.

In operation S340, backup data BD and write addresses WA corresponding to the HDD 160 may be generated. That is, the generated write addresses WA may correspond with available writable address values of the HDD 160. In particular, in operation S341, the storage management driver 222 can provide a start address SA to the operating system 221 in response to the hibernation request.

The start address SA can be any point of a free storage region of the HDD 160. The operating system 221 can wait until backup data BD and write addresses WA are received.

In operation S342, the operating system 221 may generate backup data BD and write addresses WA according to the generated start address SA. The write addresses WA may correspond to the HDD 160. That is, the generated write addresses WA may correspond with available writable address values of the HDD 160.

In operation 350, the backup data BD can be sent to the HDD 160 according to the write addresses WA. The transferred backup data BD may be stored according to the write addresses WA of the HDD 160.

Figure 10:
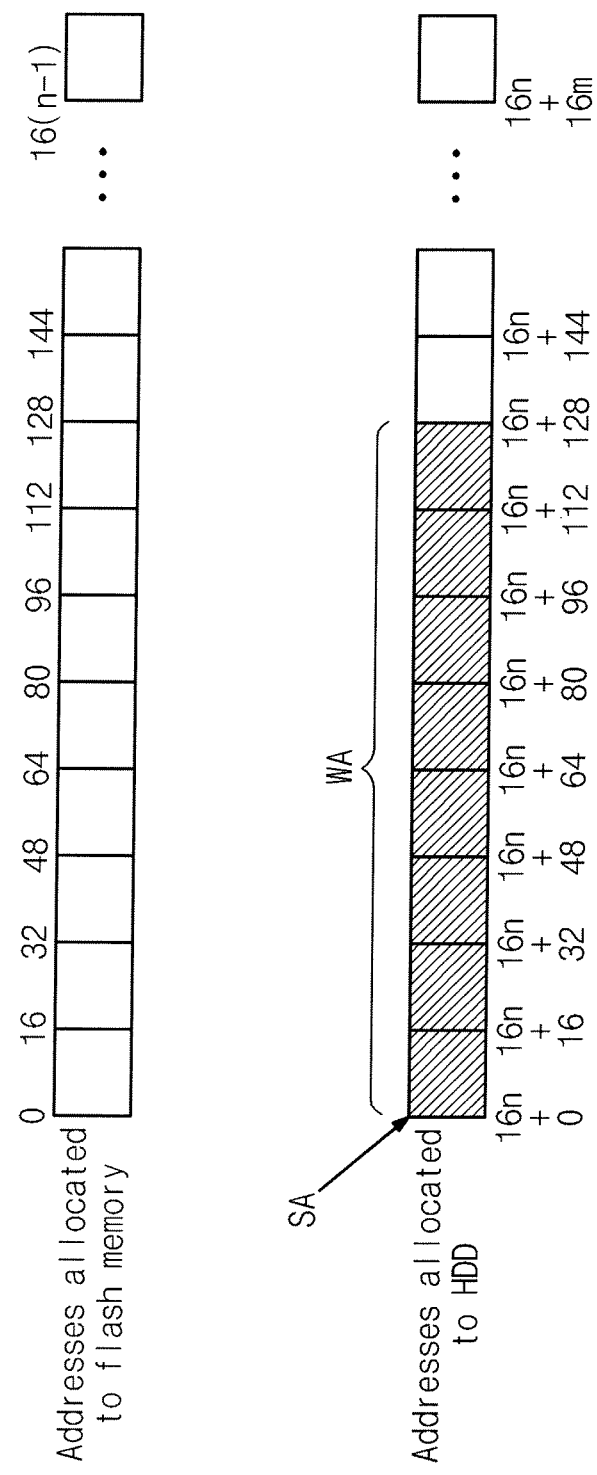
FIG. 10 is a diagram illustrating a start address generated by a storage management driver in FIG. 9 and write addresses generated by an operating system according to exemplary embodiments of the present general inventive concept.

FIG. 10 is a diagram illustrating a start address generated by a storage management driver in FIG. 9 and write addresses generated by an operating system according to exemplary embodiments of the present general inventive concept. Referring to FIG. 10, a start address SA may correspond to any point of a free storage region of the HDD 160.

The start address SA can be a start point of write addresses WA. For example, the start address SA may correspond to a logical block address 16$n$. Values of logical block addresses of the write addresses WA can start from the logical block address 16$n$.

In FIG. 10, the write addresses WA may correspond to logical block addresses 16n to (16n+112). A size of a storage region appointed by write addresses WA may be changed according to a size of backup data BD. That is, as a size of backup data BD increases, write addresses WA may correspond with more logical block addresses.

Figure 11:
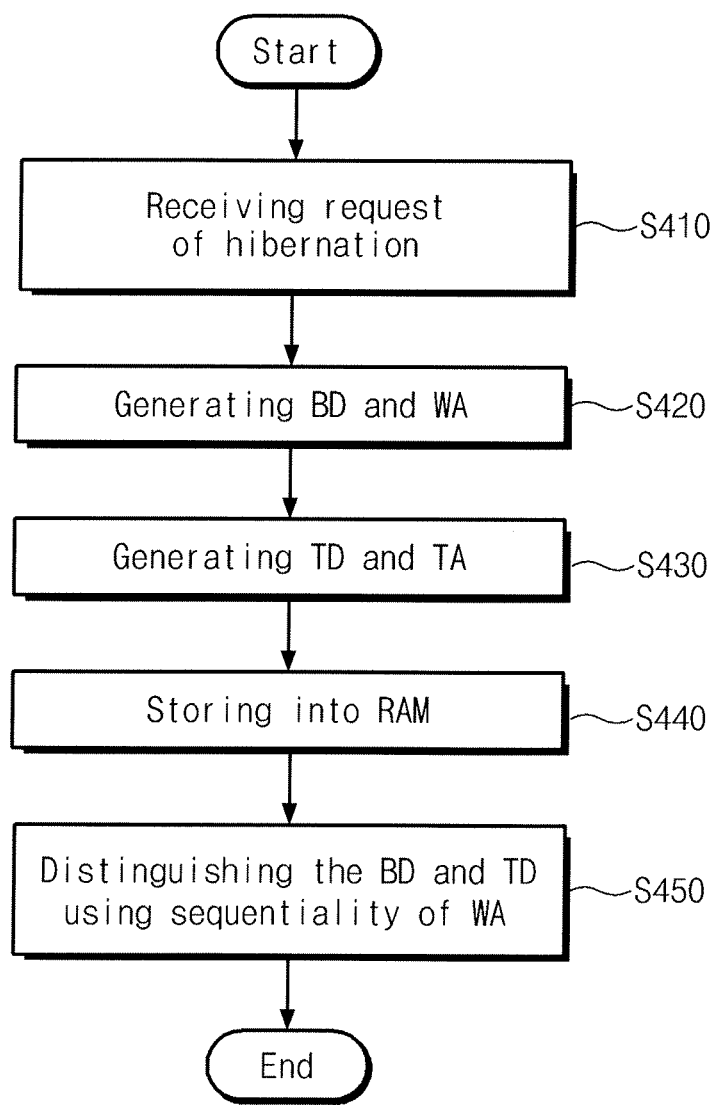
FIGS. 11 to 13 illustrate a hibernation method according to exemplary embodiments of the present general inventive concept.
Figure 12:
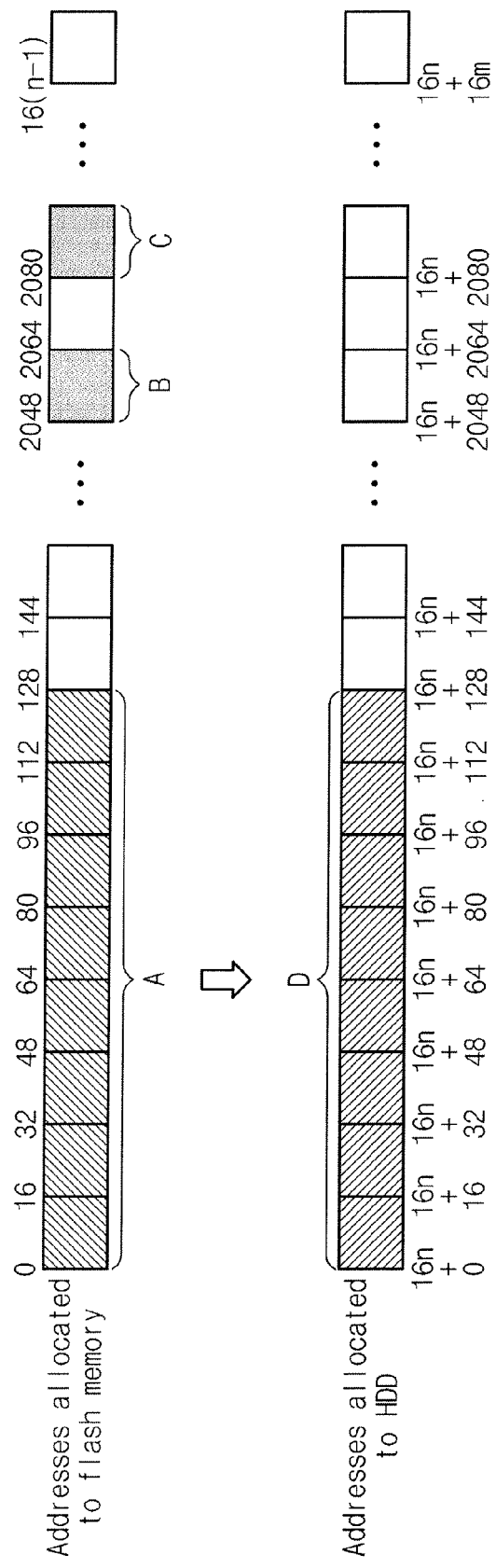
Figure 13:
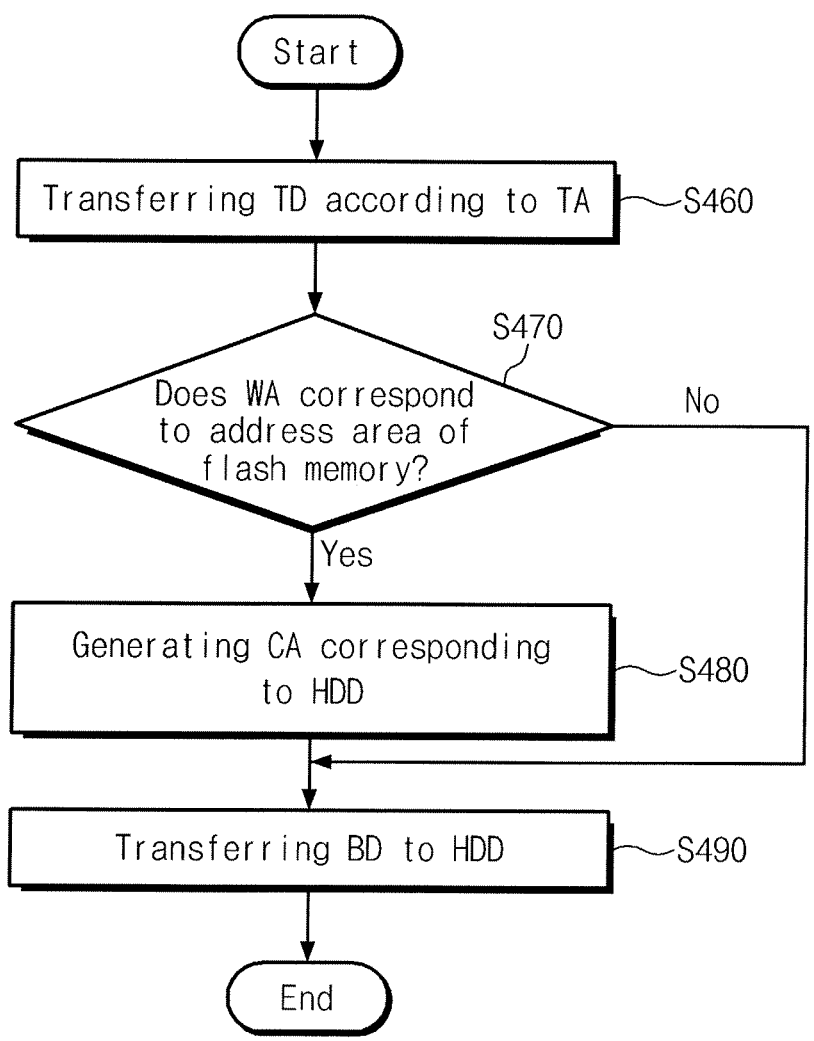

FIGS. 11 to 13 illustrate a hibernation method according to exemplary embodiments of the present general inventive concept.

FIG. 11 illustrates distinguishing backup data BD and temporary data TD using the sequence of write addresses WA according to exemplary embodiments of the present general inventive concept. Referring to FIG. 11, in operation S410, a storage management driver 222 can determine whether a hibernation request has been issued. That is, as described in operations S110 to S130 in FIG. 3, an operating system 221 monitors whether a hibernation request is issued. If so, the storage management driver 222 can perceive the hibernation request. The storage management driver 222 can sense generated data in response to the hibernation request and/or determine what data has been generated in response to the hibernation request. In exemplary embodiments of the present general inventive concept, the storage management driver 222 can log generated data in response to the hibernation request. In operation S420, at the hibernation request (refer to FIG. 2 and the related description above), the operating system 221 can generate backup data BD and write addresses WA.

In operation S430, the operating system 221 can generate temporary data TD and temporary addresses TA. The temporary data TD may be data generated by applications 230, which are executed before the hibernation request, at the hibernation request. That is, the applications 230 may be executed before the hibernation request, and the temporary data TD may be data generated by the applications 230 when a hibernation request is received. In exemplary embodiments of the present general inventive concept, temporary data TD may be generated to retain data which is used by the applications 230. That is, temporary data TD can be data that is generated by an application upon receiving a hibernation request. In exemplary embodiments, temporary data TD may be generated by the applications 230 or the operating system 221. Temporary addresses TA correspond to a storage region (e.g., available addresses of the flash memory 150 and/or the HDD 160) where the temporary data TD is to be stored.

For example, in a document-oriented application, user data UD1 to UDk (refer to FIG. 4) may correspond to data generated and processed by a user (e.g., a document file). Temporary data TD may correspond to data generated and processed by an application at hibernation.

In operation S440, the storage management driver 222 can cache the backup data BD, the write addresses WA, the temporary data TD, and the temporary addresses TA. In exemplary embodiments of the present general inventive concept, the storage management driver 222 can cache at least one of the backup data BD, the write addresses WA, the temporary data TD, and the temporary addresses TA in the flash memory 150 and/or the HDD 160.

In operation S450, the storage management driver 222 can discriminate between backup data BD using the sequence of write addresses WA. That is, a calculation may be performed on data stored in RAM 120 from CPU 110. As the calculation is made, the backup data BD, the write addresses WA, the temporary data TD, and the temporary addresses TA may be discriminated.

FIG. 12 illustrates a write addresses WA, temporary addresses TA, and conversion addresses CA. First to third storage regions A to C (i.e., first storage region A, second storage region B, and third storage region C) may correspond to addresses generated at hibernation.

An operating system 221 may generate write addresses WA having a sequence when backup data BD is generated. For example, the operating system 221 can generate logical block addresses 0 to 112 such that an address value is increased sequentially. That is, write addresses WA generated by the operating system 221 may correspond to logical block addresses 0 to 112.

The HDD 160 can write data by rotating a platter (not illustrated) that can store the data. Accordingly, when logical block addresses have a sequence (e.g., such as the sequence illustrated in FIG. 12), data may be stored in the HDD 160 more rapidly as compared with when the sequence is unavailable and/or is not used.

With exemplary embodiments of the present general inventive concept, a storage management driver 222 may determine write addresses WA and temporary addresses TA according to the sequence of write addresses WA. Backup data BD may be stored in the HDD 160 according to the result of the determination of the write addresses WA and temporary addresses TA.

In FIG. 12, the first storage region A may correspond to logical block addresses 0 to 112. Logical block addresses corresponding to the first storage region A may be increased sequentially (see, e.g., storage region D illustrated in FIG. 12, which sequentially increases the logical block addresses by values that are multiples of 16). Accordingly, the first storage region A may be determined to correspond to write addresses WA by the storage management driver 222.

Logical block addresses corresponding to the second and third storage regions B and C may not be increased sequentially by the storage management driver. Accordingly, the second and third storage regions B and C may be determined to correspond to temporary addresses TA by the storage management driver 222.

As illustrated in FIG. 12, storage regions A, B, and C may include addresses allocated to a flash memory (e.g., flash memory 150), and the fourth storage region D may include addresses allocated to the HDD 160. In exemplary embodiments of the present general inventive concept, the storage management driver 222 may copy and/or move the data (e.g., backup data BD and/or temporary data TD) stored in the first storage region A of the flash memory 150 to the fourth storage region D of the HDD 160.

FIG. 13 is a flowchart illustrating a method of transferring backup data BD and temporary data TD determined according to exemplary embodiments of the present general inventive concept illustrated in FIG. 10. Referring to FIG. 13, in operation S460, temporary data TD can be transferred according to temporary addresses TA. The temporary data TD can be stored according to the temporary addresses TA. For example, where the temporary addresses TA correspond to a flash memory 150 (e.g., when the values of the temporary addresses TA correspond to available address values of the flash memory 150), temporary data TD can be transferred to and stored in the flash memory 150. FIG. 13 illustrates an example where temporary data TD is transferred prior to backup data BD. In exemplary embodiments of the present general inventive concept, temporary data TD can be transferred following backup data BD. That is, temporary data TD can be transferred to and stored in the flash memory 150 prior to or after the backup data BD is transferred to the flash memory 150.

Backup data BD may be transferred in the same manner as illustrated in FIG. 3 and described above. In operation S470, a storage management driver 222 may determine whether write addresses WA correspond to the flash memory 150 (e.g., whether the write addresses correspond to the values of the available addresses of the flash memory 150). When write addresses WA correspond to the flash memory 150 (e.g., when the values of the write addresses WA correspond to the values of the available addresses of the flash memory 150), the operation S480 may be performed. When write addresses WA correspond to HDD 160 (e.g., when the values of the write addresses WA correspond to the values of the available addresses of the HDD 160), the operation S490 may be performed.

In operation S480, the storage management driver 222 can generate conversion addresses CA corresponding to the HDD 160. In exemplary embodiments of the present general inventive concept, write addresses WA and conversion addresses CA may be stored in RAM 120 as a mapping table. A mapping table 125 may be continually updated until generation of conversion addresses CA is ended and/or completed. When updating of the mapping table 125 is completed, the mapping table may be stored in the flash memory 150 or the HDD 160.

In operation S490, backup data BD can be sent to the HDD 160. The backup data BD may be sent according to generated conversion addresses CA. When conversion addresses CA are not generated, backup data BD may be transferred according to write addresses WA (e.g. the values of the available write addresses WA). The backup data BD may be transferred and stored in the HDD 160.

With the hibernation methods illustrated in FIGS. 11 to 13 and described above, the storage management driver 222 can cache backup data BD, write addresses WA, temporary data TD, and temporary addresses TA. In exemplary embodiments of the present general inventive concept, the storage management driver 222 can cache the backup data BD, write addresses WA, temporary data TD, and temporary addresses TA in the RAM 120, the flash memory 150, and/or the HDD 160. The storage management driver 222 can distinguish the write addresses WA and the temporary addresses TA to store the backup data BD in the HDD 160. The temporary data TD may be stored according to the temporary addresses TA. The temporary data TD may be stored, for example, the flash memory 150 and/or the HDD 160 according to the temporary addresses TA.

Figure 14:
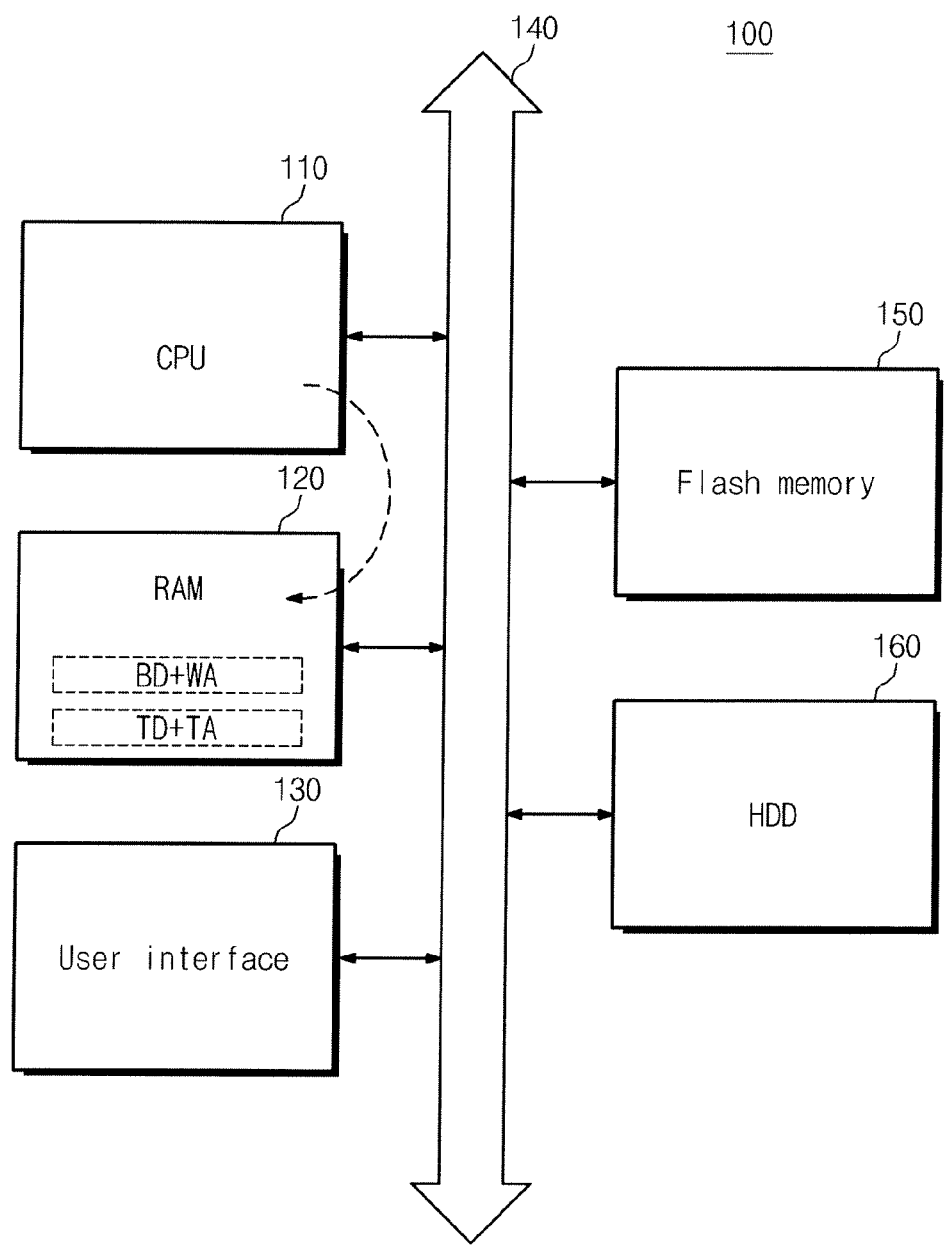
FIGS. 14 to 16 are diagrams further illustrating the hibernation method illustrated in FIGS. 11 to 13 according to exemplary embodiments of the present general inventive concept.
Figure 15:
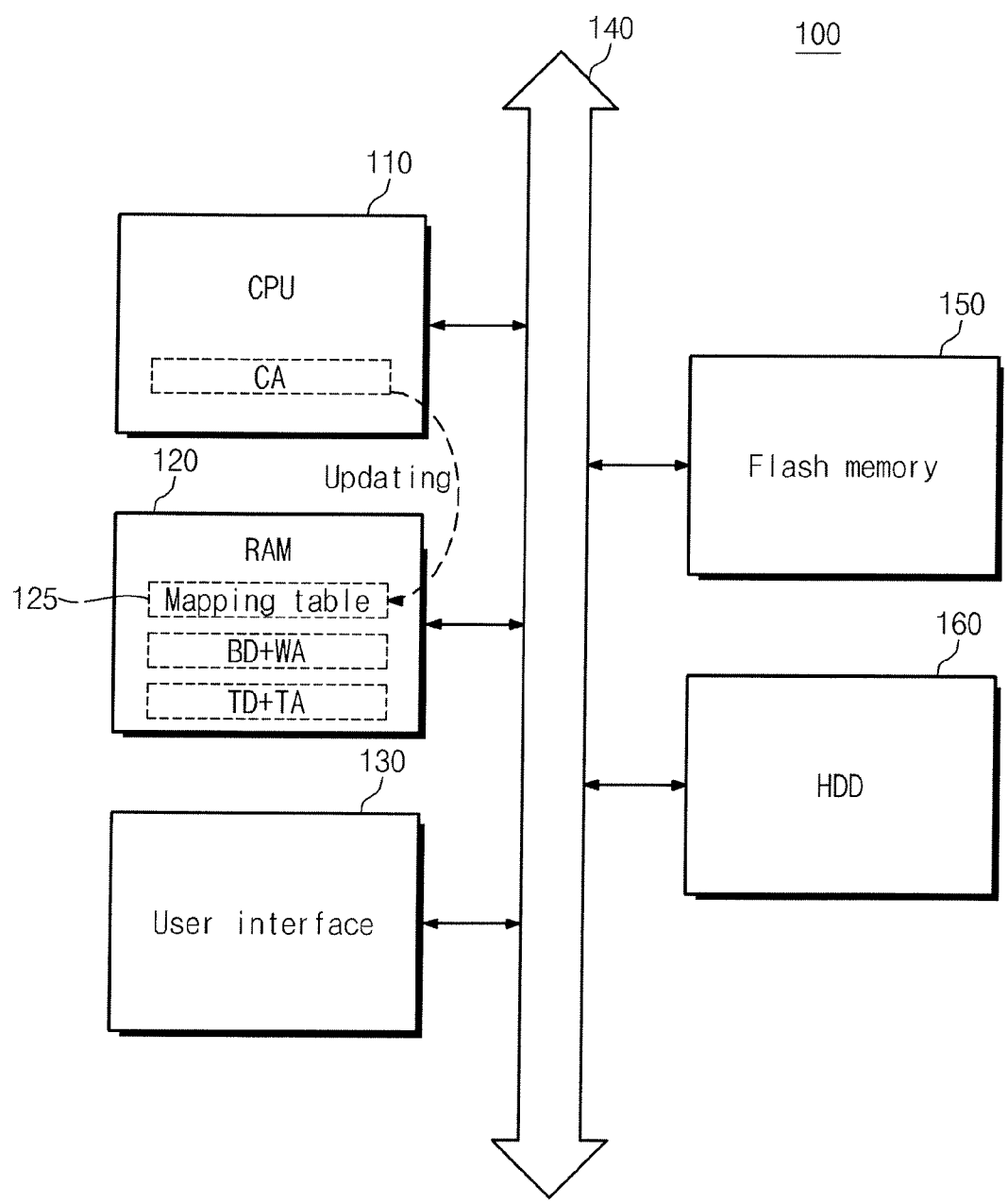
Figure 16:
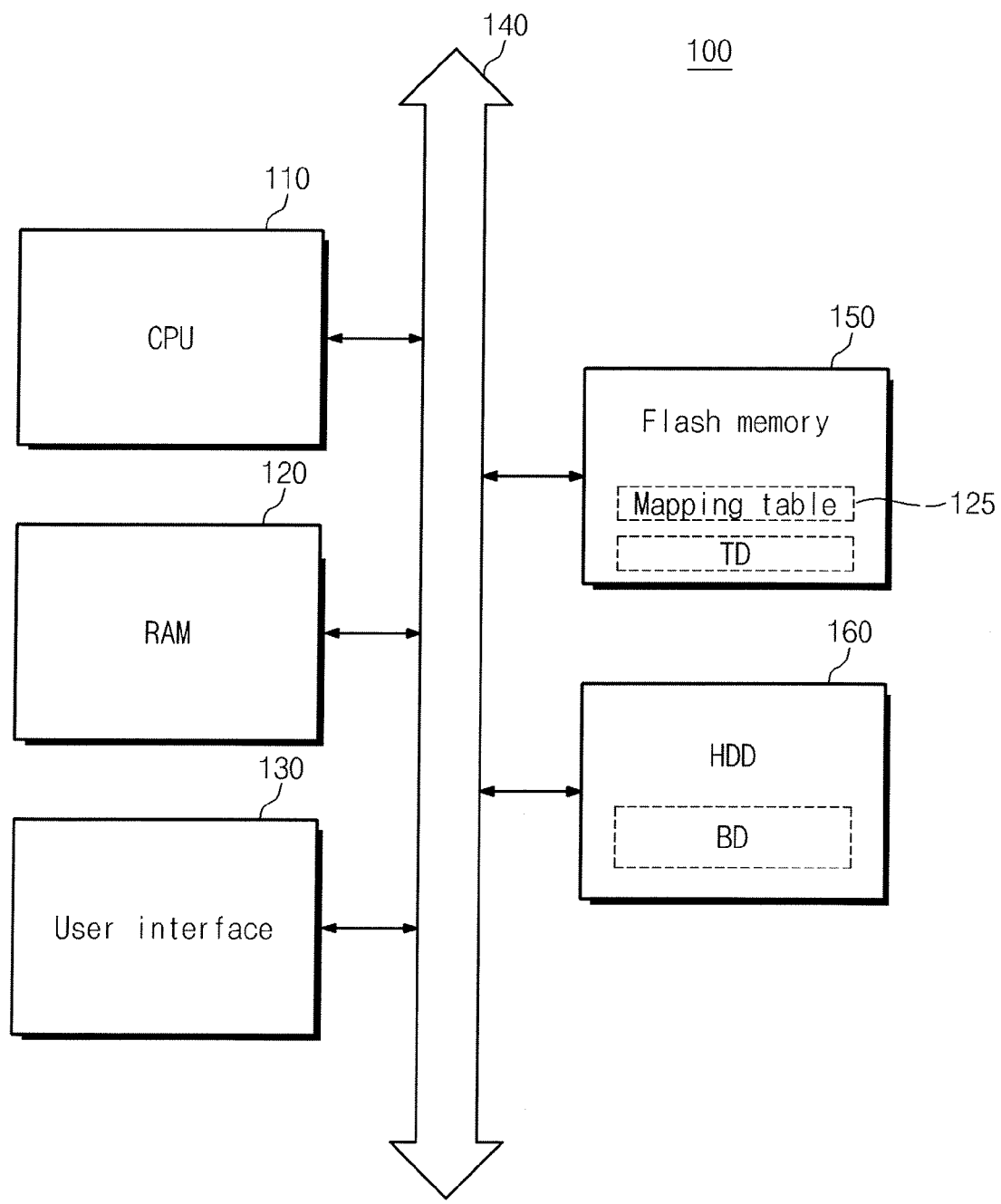

FIGS. 14 to 16 are diagrams further illustrating the hibernation method of FIGS. 11 to 13 according to exemplary embodiments of the present general inventive concept. Referring to FIG. 14, backup data BD and write addresses WA generated by CPU 110, and temporary addresses and data TA and TD, can be transferred to RAM 120.

In particular, a storage management driver 222 can monitor data generated after a hibernation request. In exemplary embodiments of the present general inventive concept, the storage management driver 222 can log generated data (e.g. in a generated data log file). The storage management driver 222 can cache backup data and addresses BD and WA, as well as temporary data and addresses TD and TA using the RAM 120. The storage management driver 222 can drive and/or control the CPU 110 to discriminate between the backup data BD and the temporary data TD.

Referring to FIG. 15, where the backup data BD correspond to a flash memory 150, the storage management driver 222 can generate conversion addresses CA. The conversion addresses CA may be generated by the storage management driver 222 as a calculation is executed at the CPU 110 (e.g., where the calculation is related to the generation of the conversion addresses CA). When the conversion addresses CA are generated, a mapping table 125 of the RAM 120 may be updated. When generation of the conversion addresses CA is completed, updating of the mapping table 125 may be ended. As illustrated in FIG. 15, the RAM 120 can store the backup data BD and the write address WA, where the write address WA may be a memory location to store the backup data BD (e.g., an address of the flash memory 150). The RAM 120 may also store the temporary data TD and a temporary address TA, which may be a memory location to store the temporary data TD (e.g., an address of the HDD 160).

Referring to FIG. 16, the backup data BD can be stored in HDD 160. FIG. 16 illustrates an example that the mapping table 125 can be stored in the flash memory 150. In exemplary embodiments of the present general inventive concept, the mapping table 125 can be stored in the HDD 160. At a recovery mode, an operating system 221 can read the backup data BD according to the mapping table 125. As illustrated in FIG. 16, the temporary data TD can be stored in the flash memory 150.

The temporary data TD can be stored in a storage region corresponding to the temporary addresses TA. FIG. 16 illustrates an example where the temporary data TD can be stored in the flash memory 150. Although not illustrated in FIG. 16, the temporary addresses TA may be stored in a predetermined storage region of any one of the flash memory 150 and the HDD 160. At a recovery mode, the operating system 221 may acquire information of the temporary addresses TA by reading the predetermined storage region. The operating system 221 can read the temporary data TD based on the temporary addresses TA.

Figure 17:
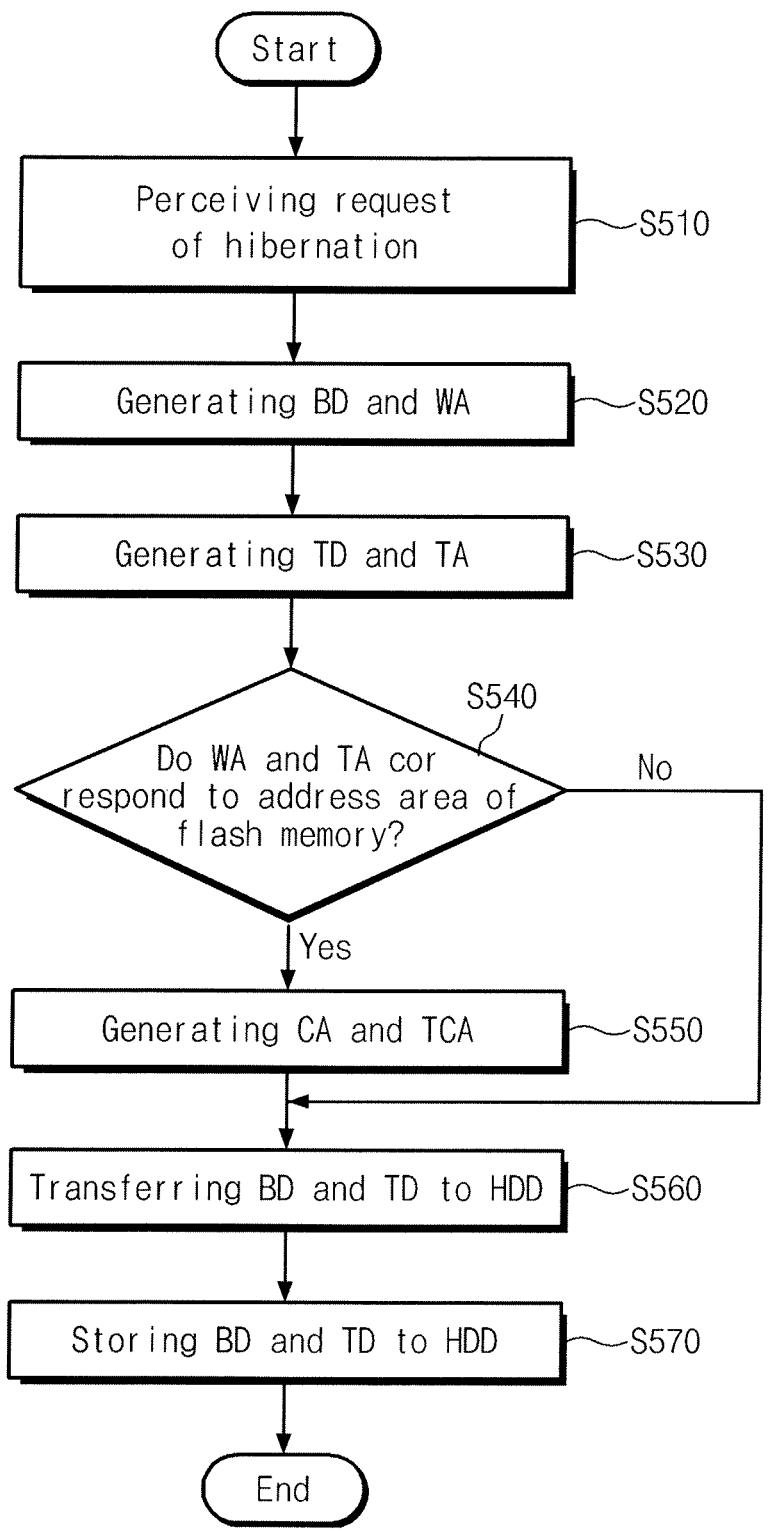
FIG. 17 is a flowchart illustrating a hibernation method according to exemplary embodiments of the present general inventive concept.

FIG. 17 is a flowchart illustrating a hibernation method according to exemplary embodiments of the present general inventive concept. Referring to FIG. 17, in operation S510, a storage management driver 222 can determine whether a hibernation request has been issued and/or received. That is, as described in operations S110 to S130 in FIG. 3, the storage management driver 222 may monitor whether the hibernation request is issued.

In operation S520, backup data BD and write addresses WA can be generated in response to the hibernation request by the storage management driver 222 and/or the unified operating system 220. In operation S530, temporary data TD and temporary addresses TA can be generated.

In operation S540, the storage management driver 222 can determine whether the write addresses WA and the temporary addresses TA correspond to a flash memory 150.

When the write addresses WA and the temporary addresses TA correspond to the flash memory 150, respectively, the method proceeds to operation S550. When the write addresses WA and the temporary addresses TA do not correspond to the flash memory 150, the method proceeds to operation S560.

In operation S550, the storage management driver 222 can generate conversion addresses CA and temporary conversion addresses TCA corresponding to the write addresses WA and the temporary addresses CA.

The conversion addresses CA may be generated according to whether the write addresses WA correspond to the flash memory 150. The temporary conversion addresses TCA may be generated according to whether the write addresses WA correspond to the flash memory 150.

In exemplary embodiments of the present general inventive concept, a mapping table 125 can include the write and conversion addresses WA and CA, the temporary addresses TA, and the temporary conversion addresses TCA may be stored in RAM 120. That is, the mapping table 125 may include write addresses WA, conversion addresses CA corresponding to the WA, and mapping information between the write addresses WA and the conversion addresses CA. The mapping table 125 may include temporary addresses TA, temporary conversion addresses TCA corresponding to the TA, and mapping information between the temporary addresses TA and the temporary conversion addresses TCA.

In operation S560, the backup data BD and the temporary data TD can be transferred to the HDD 160. In operation S570, the backup data BD and the temporary data TD can be stored in the HDD 160. The backup data BD and the temporary data TD may be stored in the HDD 160 according to the conversion addresses CA and the temporary conversion addresses TCA. Alternatively, the backup data BD and the temporary data TD may be stored in the HDD 160 according to the write addresses WA and the temporary addresses TA.

As understood from the above description, the backup data BD, the write addresses WA, the temporary data TD, and the temporary addresses TA may not be cached in the RAM 120. Distinguishing of the backup data BD and the temporary data TD according to the sequence of write addresses WA may not be performed. That is, backup data BD and temporary data TD that may be generated following the hibernation request can be stored in the HDD 160.

Figure 18:
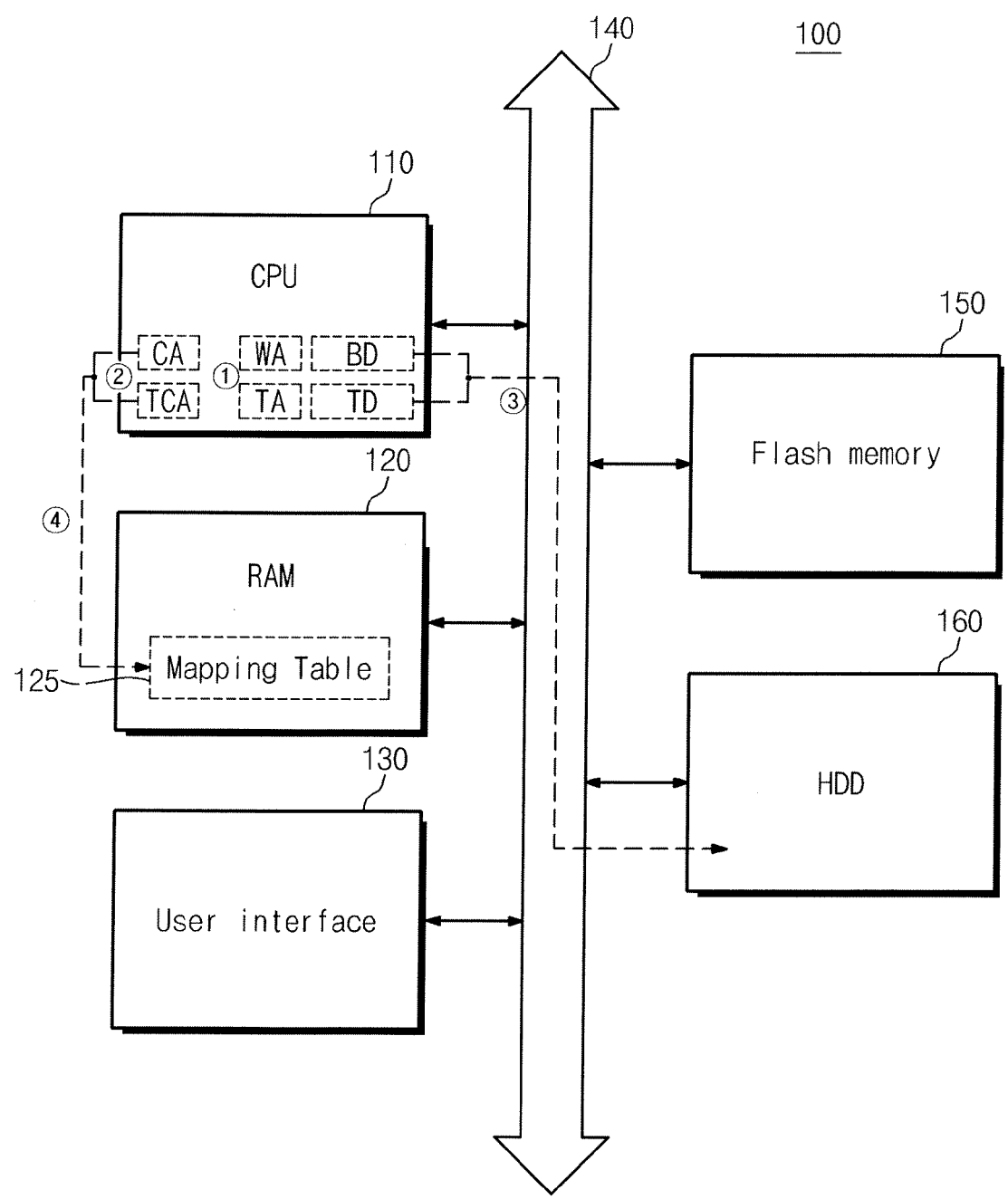
FIG. 18 illustrates a computing system operating according to the hibernation method illustrated in FIG. 17.

FIG. 18 illustrates a computing system that can operate according to the hibernation method of FIG. 17.

Referring to FIG. 18, backup data BD, write addresses WA, temporary data TD, and temporary addresses TA can be generated by the CPU 110 (e.g., at operation ① illustrated in FIG. 18). Conversion addresses CA and temporary conversion addresses TCA can be generated by the CPU 110 according to whether the write addresses WA and the temporary addresses TA correspond to a flash memory 150 (e.g., at operation ② illustrated in FIG. 18).

The backup data BD and the temporary data TD may be transferred from the CPU 110 to HDD 160 according to the conversion addresses CA and the temporary conversion addresses TCA (e.g., at operation ③ illustrated in FIG. 18). As the conversion addresses CA and the temporary conversion addresses TCA are generated by the CPU 110, a mapping table 125 is stored in RAM 120. The mapping table 125 continues to be updated until generation of the conversion addresses CA and the temporary conversion addresses TCA is ended (e.g., at operation ④ illustrated in FIG. 18). The mapping table 125 may be stored in a flash memory 150 or the HDD 160 before a computing system 100 is powered off.

In exemplary embodiments of the present general inventive concept, transferring (e.g., at operation ③) of the backup and temporary data BD and TD and updating (e.g., at operation ④) of the mapping table 125 can be performed at the same time. That is, a storage management driver 222 can update the mapping table 125 in real time when the backup and temporary data BD and TD are sent to the HDD 160.

Unlike an example illustrated in FIG. 18, where write addresses WA and temporary addresses TA correspond to the HDD 160, conversion addresses CA and temporary conversion addresses TCA may not be generated in exemplary embodiments of the present general inventive concept. That is, the backup and temporary data BD and TD may be stored in the HDD 160 according to the write addresses WA and the temporary addresses TA.

Figure 19:
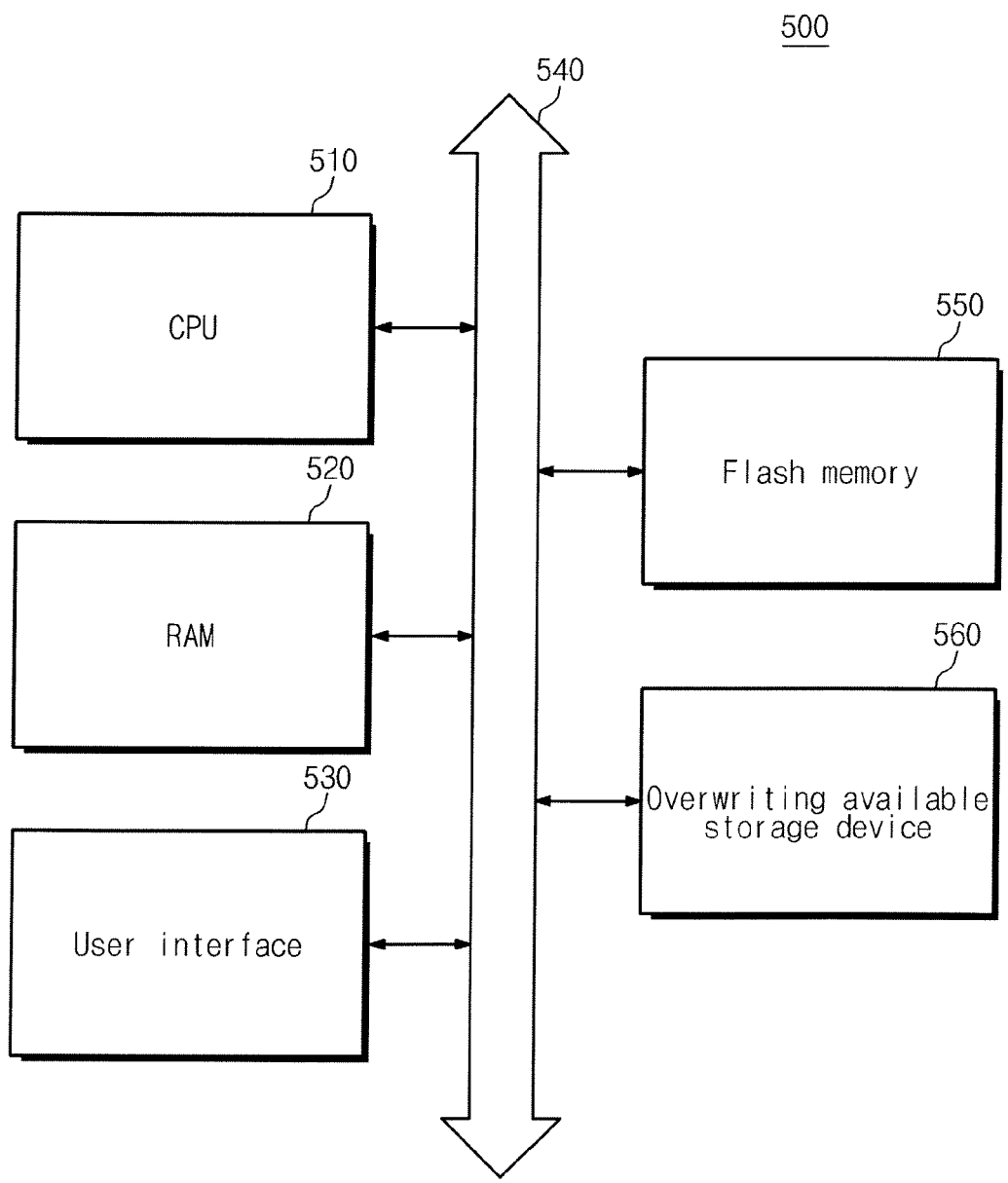
FIG. 19 is a block diagram illustrating a computing system including an over-writable storage device according to exemplary embodiments of the present general inventive concept.

FIG. 19 is a block diagram illustrating a computing system including an over-writable storage device according to exemplary embodiments of the present general inventive concept.

Referring to FIG. 19, a computing system 500 can include CPU 510, RAM 520, a user interface 530, a system bus 540, a flash memory 550, and an overwriting available storage device 560. The computing system 500 in FIG. 19 is similar to that in FIG. 1 except the HDD 160 illustrated in FIG. 1 is replaced with the overwriting available storage device 560, and description thereof is thus omitted.

The overwriting available storage device 560 may support a function that data is again written at any storage region, in which data is previously stored, without an erase operation. HDD 160 in FIG. 1 is an example of the overwriting available storage device 560. That is, the overwriting available storage device 160 may write data to a storage region in which data is presently stored without performing an erase operation.

In exemplary embodiments of the present general inventive concept, the overwriting available storage device 560 may include phase-change RAM (PRAM), magnetic RAM (PRAM), resistive RAM (RRAM), ferroelectric RAM (FRAM), hard disk drive (HDD), solid state drive (SSD), an optical storage device, floppy disk, and the like.

Figure 20:
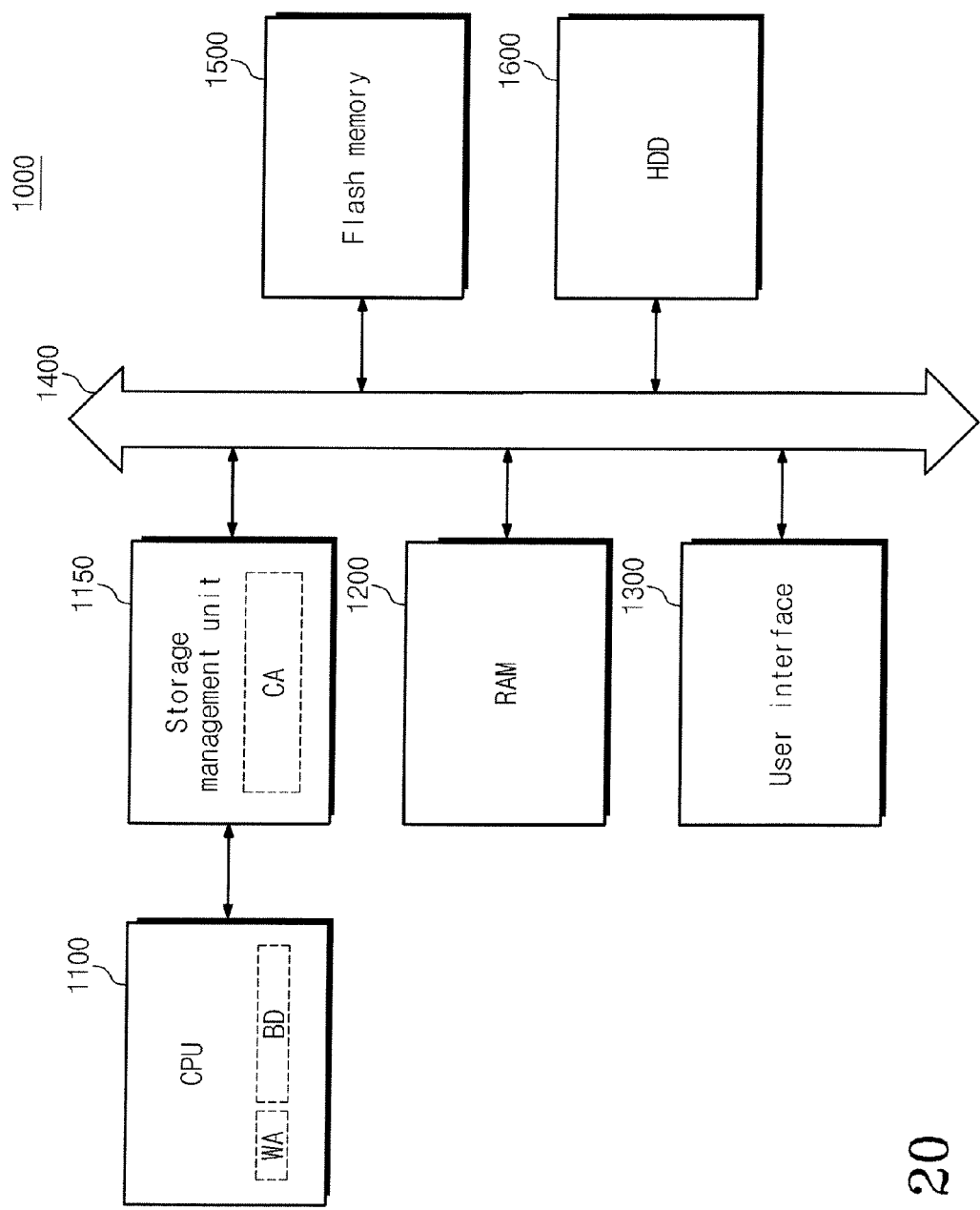
FIG. 20 is a block diagram illustrating a computing system according to exemplary embodiments of the present general inventive concept.

FIG. 20 is a block diagram illustrating a computing system according to exemplary embodiments of the present general inventive concept.

Referring to FIG. 20, a computing system 1000 can include CPU 1100, storage management unit 1150, RAM 1200, a user interface 1300, a system bus 1400, a flash memory 1500, and HDD 1600. The computing system 1000 can operate according to the control of an operating system 221 (refer to FIG. 2). The computing system 1000 in FIG. 20 is similar to that in FIG. 1 except for the CPU 1100 and the storage management unit 1150, and description thereof is thus omitted.

At hibernation, data being processed in the computing system 1000 can be converted into backup data BD by the CPU 1100. The CPU 1100 may be a central processing unit, field programmable gate array, programmable logic device, an integrated circuit, and/or any suitable processor to carry out the exemplary embodiments of the present general inventive concept described herein. The operating system 221 can make at least one calculation and/or perform at least one operation using the CPU 1100 to generate the backup data BD.

In exemplary embodiments of the present general inventive concept, the CPU 1100 can convert data stored in the RAM 1200 into backup data BD, information on applications (that is, application programs), register setting information, BIOS setup information, and the like. The CPU 1100 can generate write addresses WA to appoint and/or determine a storage region where the backup data BD can be stored.

The storage management unit 1150 can be connected with the system bus 1400 and the CPU 1100. The storage management unit 1150 may operate in the same manner as the storage management driver 222 illustrated in FIGS. 2, 3, 11, 13, and 17 and described above.

If the hibernation request is issued, the storage management unit 1150 can detect the hibernation request. The storage management unit 1150 can determine write addresses WA. The storage management unit 1150 may generate conversion addresses CA corresponding to the HDD 1600 according to whether the write addresses WA correspond to the flash memory 1500.

When the write addresses WA correspond to the flash memory 1500, the storage management unit 1150 may generate conversion addresses CA. The backup data BD may be stored in the HDD 1600 according to the conversion addresses CA. When the write addresses WA correspond to the HDD 1600, the storage management unit 1150 may not generate conversion addresses CA. The backup data BD may be stored in the HDD 1600 according to the write addresses WA.

When the conversion addresses CA are generated, the storage management unit 1150 can generate a mapping table (not illustrated) including the write addresses WA and the conversion addresses CA. The mapping table thus generated may be stored in the flash memory 1500 and/or the HDD 1600.

At the hibernation, backup data BD, write addresses WA, temporary data TD, and temporary addresses TA can be generated.

The storage management unit 1150 can determine and/or generate the backup data BD and the write addresses WA. That is, the storage management unit 1150 can determine which data from among all of the stored data is the backup data BD, and can determine the write addresses WA from the available write addresses. The storage management unit 1150 can cache the backup data BD, the write addresses WA, the temporary data TD, and the temporary addresses TA in the RAM 1200. The storage management unit 1150 can load data stored in the RAM 1200 to determine the backup data BD (e.g., from all of the data stored in the RAM 1200) using the sequence of the write addresses WA. In exemplary embodiments of the present general inventive concept, the storage management unit 1150 may generate conversion addresses CA associated only with the backup data BD, according to whether the write addresses WA correspond to the flash memory 1500.

In exemplary embodiments of the present general inventive concept, the storage management unit 1150 can check whether write addresses WA and temporary addresses TA generated following the hibernation request correspond to the flash memory 150. Conversion addresses may be generated according to the checked result. The write addresses WA and the temporary addresses TA generated according to the hibernation request may be stored in the HDD 1600.

Figure 21:
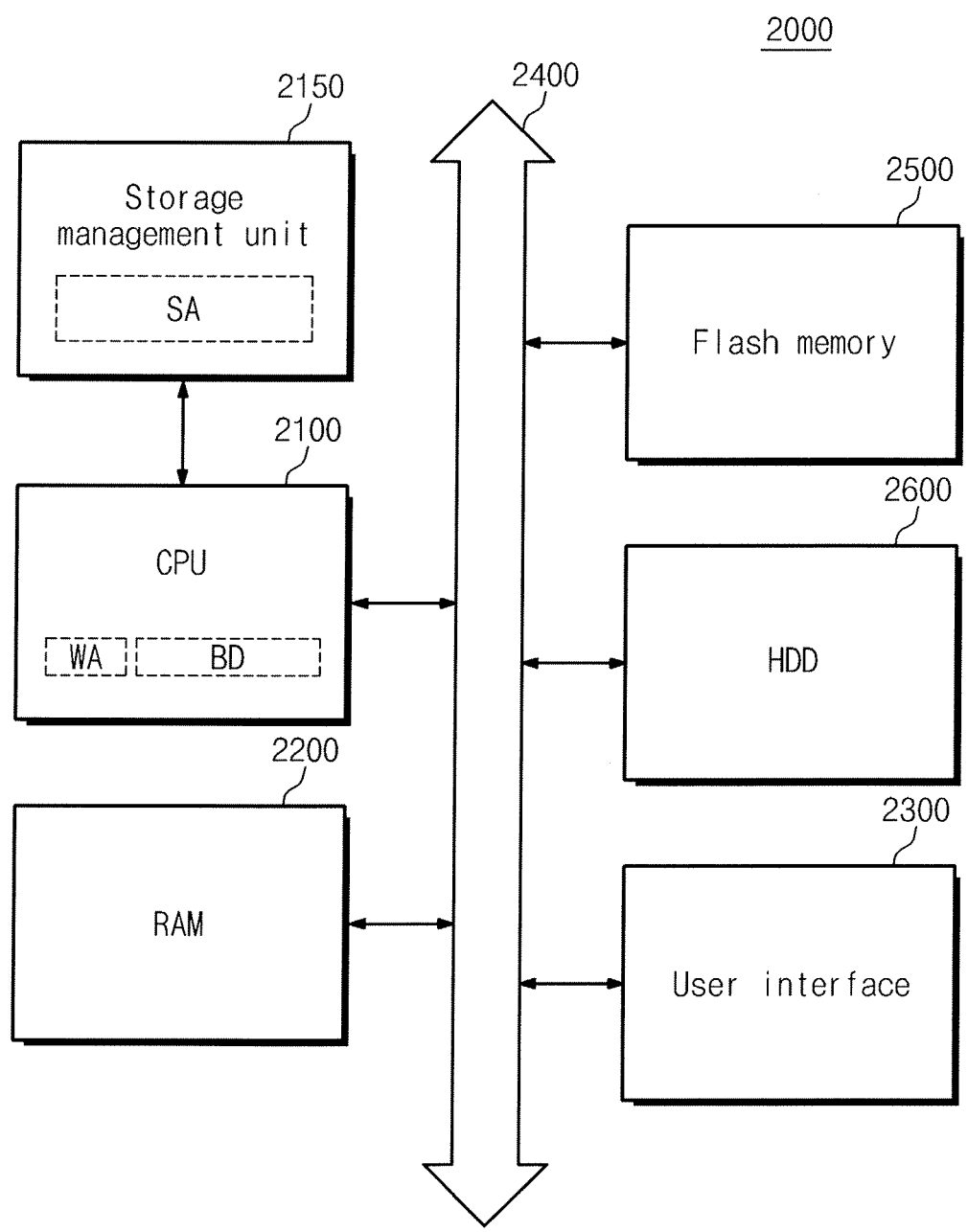
FIG. 21 is a block diagram illustrating a computing system according to exemplary embodiments of the present general inventive concept.

FIG. 21 is a block diagram illustrating a computing system according to exemplary embodiments of the present general inventive concept.

Referring to FIG. 21, a computing system 2000 can include CPU 2100, a storage management unit 2150, RAM 2200, a user interface 2300, a system bus 2400, a flash memory 2500, and HDD 2600. The computing system 2000 can operate and/or be controlled by the operating system 221 (refer to FIG. 2). The computing system 2000 in FIG. 21 can be similar to that illustrated in FIG. 1 except for the CPU 2100 and the storage management unit 2150, and description thereof is thus omitted.

The CPU 2100 may be a central processing unit, a field programmable gate array, a programmable logic device, an integrated circuit, and/or any suitable processor to carry out exemplary embodiments of the present general inventive concept. The storage management unit 2150 may operate similarly to the storage management driver 222 illustrated in FIGS. 2 and 9 and described above. The storage management unit 2150 can generate a start address SA at hibernation. The start address SA can correspond to any point of a free storage region of the HDD 2600.

If a hibernation request is issued, the CPU 2100 can wait to receive the start address SA from the storage management unit 2150. When the start address SA is received from the storage management unit 2150, the CPU 2100 can generate write addresses WA according to the start address SA. That is, the operating system 221, using the CPU 2100, can generate the write addresses WA according to the start address SA. Accordingly, the write addresses WA thus generated may correspond to a part of a free storage region of the HDD 2600. Backup data BD may be stored in the HDD 2600 according to the write addresses WA.

FIG. 21 illustrates an example that the storage management unit 2150 can be directly connected with the CPU 2100. In exemplary embodiments of the present general inventive concept, the storage management unit 2150 can be connected with the CPU 2100 via the system bus 2400.

According to the above description, backup data can be stored in a hard disk drive (e.g., HDD 160 illustrated in FIG. 2, HDD 1600 illustrated in FIG. 20, and HDD 2600 illustrated in FIG. 21) and/or a solid state drive. In exemplary embodiments of the present general inventive concept, memory cells included in a flash memory may not be programmed to store the backup data whenever hibernation is requested. Accordingly, it is possible to improve the reliability of data stored in the flash memory.

Figure 22:
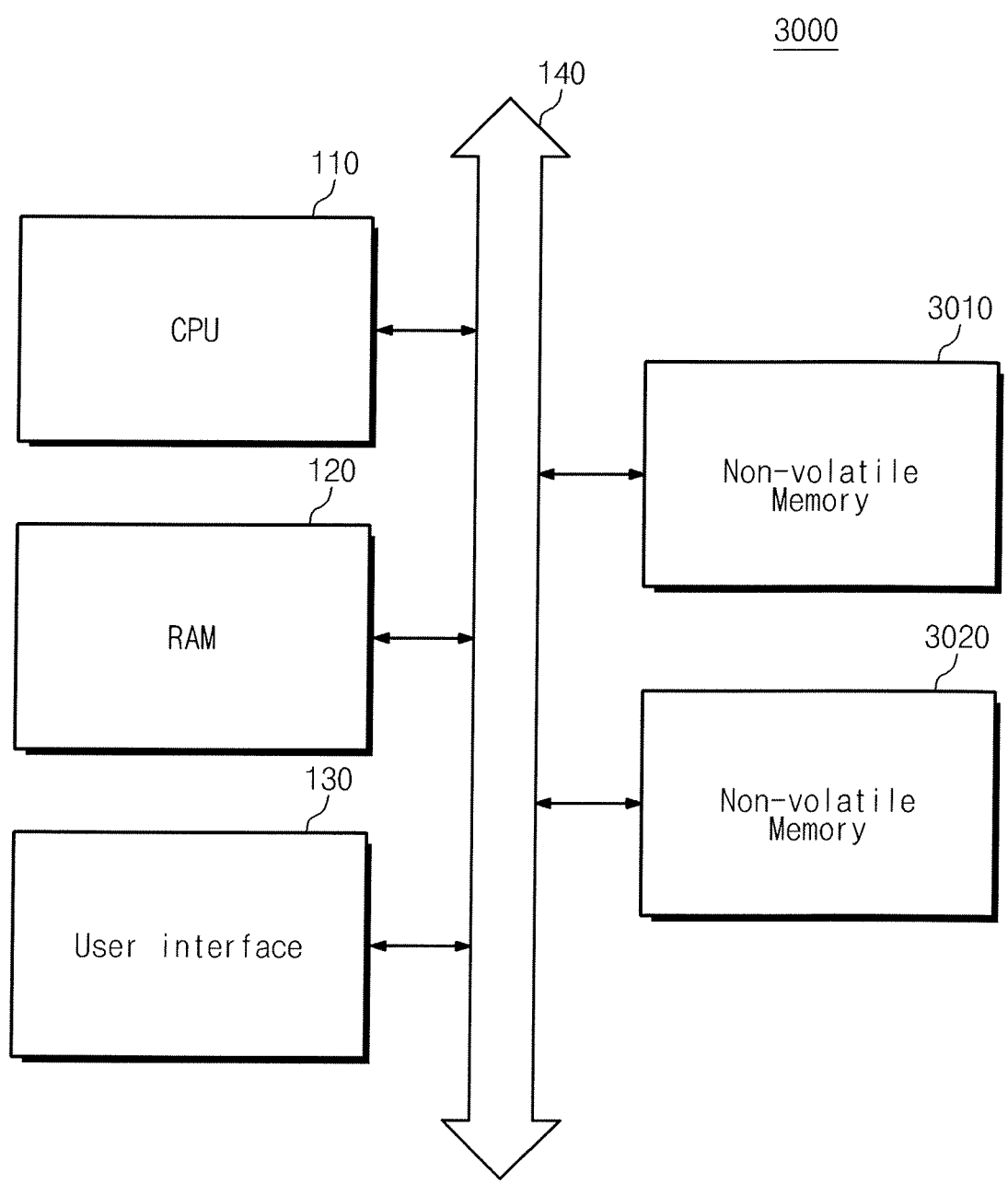
FIG. 22 is a block diagram illustrating a computing system according to exemplary embodiments of the present general inventive concept.

FIG. 22 is a block diagram illustrating a computing system according to exemplary embodiments of the present general inventive concept.

Referring to FIG. 22, a computing system 3000 can include CPU 110, RAM 120, a user interface 130, a system bus 140, a non-volatile memory 3010 and a non-volatile memory 3020. The computing system 3000 can operate according to the control of an operating system 221 (refer to FIG. 2). The computing system 3000 in FIG. 22 is similar to that in FIG. 1 except for the non-volatile memory 3010 and the non-volatile memory 3020, and description thereof is thus omitted.

Non-volatile memory 3010 and non-volatile memory 3020 may be any suitable non-volatile memory that stores and/or retains data when computing system 3000 is not powered. The non-volatile memory 3010 may replace the flash memory 150 illustrated in FIG. 1, and the non-volatile memory 3020 may replace the HDD 160 illustrated FIG. 1. That is, as described above in connection with FIGS. 1-8, the CPU 110 can generate a write address WA and backup data BD from at least the user data UD of RAM 120. The CPU 110 can generate conversion addresses CA that correspond to the write addresses WA, and continually update the mapping table 125 stored in RAM 120. The mapping table 125 can include the write addresses WA and the conversion addresses CA, the write addresses WA, and mapping information between the write addresses WA and the conversion addresses CA. The mapping table 125 can be transferred to the non-volatile memory 3010 according to in response to the control of the CPU 110. Backup data BD can be transferred from the CPU 110 to the non-volatile memory 3020 via the system bus 140, and the backup data can be stored in the non-volatile memory 3020 according to the conversion addresses CA. Alternatively, the backup data BD can be stored in the non-volatile memory 3010, and the mapping table 125 can be stored in the non-volatile memory 3020.

Although several embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A hibernation method of a computing system, the method comprising:
   generating backup data and write addresses according to at least a portion of data utilized by the computing system at a hibernation request;
   generating conversion addresses corresponding to a first non-volatile memory when the write addresses correspond to a second non-volatile memory; and
   storing the backup data in the first non-volatile memory according to at least one of the write addresses and the conversion addresses,
   wherein the storing the backup data in the first non-volatile memory according to at least one of the write addresses and the conversion addresses comprises:

storing the backup data according to the conversion addresses in response to the conversion addresses being generated and the write addresses are free from being generated; and storing the backup data according to the write addresses in response to the write addresses corresponding to available addresses of the first non-volatile memory.

2. The hibernation method of claim 1, wherein the storing the backup data in the first non-volatile memory according to at least one of the write addresses and the conversion addresses comprises:

generating a mapping table including the write addresses and the conversion addresses when the conversion addresses are generated.

3. The hibernation method of claim 2, further comprising:
storing the mapping table in a predetermined storage region of at least one of the first and second non-volatile memories.

4. The hibernation method of claim 3, further comprising:
receiving a recovery request; and
reading data from the predetermined storage region to load the read data as the mapping table according to the recovery request.

5. The hibernation method of claim 4, further comprising:
reading the backup data according to the conversion addresses included in the mapping table.

6. The hibernation method of claim 1, wherein the generating backup data and write addresses according to at least a portion of data utilized by the computing system at a hibernation request comprises:

generating temporary data and temporary addresses from an application being driven.

7. The hibernation method of claim 6, further comprising:
determining the write addresses and the temporary addresses according to whether values of the write addresses increase sequentially.

8. The hibernation method of claim 7, further comprising:
storing the temporary data according to the determined temporary addresses.

9. The hibernation method of claim 6, further comprising:
generating temporary conversion addresses corresponding to the first non-volatile memory when the temporary addresses correspond to available addresses of the flash memory.

10. The hibernation method of claim 9, further comprising:
storing the temporary data in the first non-volatile memory according to at least one of the temporary addresses and the temporary conversion addresses.

11. The hibernation method of claim 10, wherein the storing the temporary data in the first non-volatile memory comprises:

storing the temporary data according to the temporary conversion addresses when the temporary conversion addresses are generated.

12. A hibernation method of a computing system, the method comprising:
determining when a hibernation request has been generated;
generating back-up data and write addresses;
generating temporary data and temporary addresses;
in response to the generated write addresses and the temporary addresses corresponding to an address area of a first non-volatile memory, generating conversion addresses and temporary conversion addresses and transferring and storing the back-up data and the temporary data to a second non-volatile memory and not the first non-volatile memory; and
in response to the generated write addresses and the temporary addresses not corresponding to the address area of the first non-volatile memory, transferring and storing the back-up data and the temporary data to the second non-volatile memory.

13. The hibernation method of claim 12, wherein the conversion addresses are generated when the write addresses correspond to the first non-volatile memory, and wherein the temporary conversion addresses are generated when the temporary addresses correspond to the first non-volatile memory.

14. The hibernation method of claim 12, wherein the back-up data and the temporary data are transferred and stored to the second non-volatile memory according to the generated conversion addresses and the temporary conversion addresses.

15. The hibernation method of claim 12, wherein the back-up data and the temporary data are transferred and stored to the second non-volatile memory according to the generated write addresses and the temporary addresses.

* * * * *